United States Patent
Ikari

(10) Patent No.: US 10,604,598 B2
(45) Date of Patent: Mar. 31, 2020

(54) METHOD OF PRODUCING (METH)ACRYLOYL-TERMINATED POLYISOBUTYLENE POLYMER

(71) Applicant: Kaneka Corporation, Osaka (JP)

(72) Inventor: Yoshihiro Ikari, Osaka (JP)

(73) Assignee: KANEKA CORPORATION, Osaka (JP)

( * ) Notice: Subject to any disclaimer, the term of this patent is extended or adjusted under 35 U.S.C. 154(b) by 24 days.

(21) Appl. No.: 16/061,284

(22) PCT Filed: Dec. 6, 2016

(86) PCT No.: PCT/JP2016/086126
§ 371 (c)(1),
(2) Date: Jun. 11, 2018

(87) PCT Pub. No.: WO2017/099043
PCT Pub. Date: Jun. 15, 2017

(65) Prior Publication Data
US 2018/0362676 A1 Dec. 20, 2018

(30) Foreign Application Priority Data
Dec. 11, 2015 (JP) ................. 2015-242462

(51) Int. Cl.
*C08F 8/14* (2006.01)
*C08F 10/10* (2006.01)
*C08F 8/18* (2006.01)
*C08F 110/10* (2006.01)

(52) U.S. Cl.
CPC ............ *C08F 10/10* (2013.01); *C08F 8/14* (2013.01); *C08F 8/18* (2013.01); *C08F 110/10* (2013.01); *C08F 2810/30* (2013.01); *C08F 2810/40* (2013.01)

(58) Field of Classification Search
CPC .... C08F 8/18; C08F 8/26; C08F 10/10; C08F 2810/40
See application file for complete search history.

(56) References Cited

U.S. PATENT DOCUMENTS

| 8,552,118 B2* | 10/2013 | Kennedy ................. C08F 10/10 525/244 |
| 8,569,420 B2* | 10/2013 | Kennedy ................. C08F 10/10 525/244 |
| 2011/0306745 A1 | 12/2011 | Storey et al. |
| 2014/0135452 A1 | 5/2014 | Storey et al. |
| 2014/0243444 A1 | 8/2014 | Ikari et al. |
| 2015/0315309 A1* | 11/2015 | Lange .................. C08F 110/10 525/333.7 |
| 2016/0083487 A1* | 3/2016 | Burdzy ................. C08F 110/10 524/579 |
| 2017/0051093 A1 | 2/2017 | Ikari et al. |

FOREIGN PATENT DOCUMENTS

| JP | 2013-528692 A | 7/2013 |
| JP | 2013-216782 A | 10/2013 |
| WO | 2013/047314 A1 | 4/2013 |

OTHER PUBLICATIONS

International Search Report issued in PCT/JP2016/086126 dated Mar. 7, 2017 (1 page).
Written Opinion issued in PCT/JP2016/086126 dated Mar. 7, 2017 (3 pages).
Extended European Search Report issued in European Application No. 16872941.6, dated May 21, 2019 (7 pages).

* cited by examiner

Primary Examiner — Irina S Zemel
Assistant Examiner — Jeffrey S Lenihan
(74) Attorney, Agent, or Firm — Osha Liang LLP

(57) ABSTRACT

A method for producing a (meth)acryloyl-terminated polyisobutylene polymer includes a step 1 of polymerizing an isobutylene monomer under the presence of a Lewis acid catalyst to prepare a halogen-terminated polyisobutylene polymer (B), a step 2 of reacting the halogen-terminated polyisobutylene polymer (B) with a compound (C) having a halogen group and a phenoxy group under the presence a Lewis acid catalyst to prepare a halogenated phenoxyalkyl-terminated polyisobutylene polymer (D), and a step 3 of reacting the halogenated phenoxyalkyl-terminated polyisobutylene polymer (D) with an acrylic acid compound (E) to prepare the (meth)acryloyl-terminated polyisobutylene polymer (A).

10 Claims, No Drawings

METHOD OF PRODUCING (METH)ACRYLOYL-TERMINATED POLYISOBUTYLENE POLYMER

TECHNICAL FIELD

One or more embodiments of the invention relate to a method for producing a (meth)acryloyl-terminated polyisobutylene polymer using a Lewis acid catalyst. More specifically, one or more embodiments of the present invention relate to a method for producing a (meth)acryloyl-terminated polyisobutylene polymer having excellent transparency.

BACKGROUND

There is widely known techniques for crosslinking a resin with active energy rays such as ultraviolet or electron beam, and these techniques have been increasingly utilized in place of a conventional curing reaction using heating as a trigger.

The techniques for curing a resin using the active energy lays can realize desolvation of the curing process, energy saving, and space saving, comparing with a thermosetting technique. Further, in the techniques, there are merits that productivity can be improved due to the completion of a reaction in a short time, and a device can be easily prepared in high performance because a light can be radiated in a uniform direction even on a substrate having a complicated shape. Therefore, the techniques have been used in applications such as ink, paint, adhesive, agent for sealing, precision part for electrical and electron applications, and modeled objects.

Resins used in the above field mainly have been required for properties such as durability, heat resistance, weather resistance, water-proof, moisture permeation resistance, and an example of the resins having the above features includes a polyisobutylene polymer having a (meth)acryloyl group at a terminal as a light cross-linking group.

For example, patent documents 1 and 2 have disclosed techniques relating to polyisobutylene polymer having a (meth)acryloyl group. Patent documents 1 and 2 disclose that a (meth)acryloyl-terminated polyisobutylene can be easily obtained not only in one pot, but also in multi-steps that a halogen group-terminated polyisobutylene is once produced and then reacted with acrylic acid or methacrylic acid to introduce (meth)acryloyl group(s).

However, patent documents 1 and 2 only disclose a general method for producing a polyisobutylene polymer, and do not disclose a concrete manufacture example required for industrially producing an isobutylene polymer and a manufacture method using a compound other than an acrylic acid or a methacrylic acid. Therefore, these patent documents need more consideration for development of the polyisobutylene polymer.

PATENT DOCUMENT

Patent Document 1: WO2013/047314
Patent Document 2: Japanese unexamined patent application publication No. 2013-216782

SUMMARY

Generally, the polyisobutylene polymer has the colorless and the transparency, and the residue of the Lewis acid catalyst used in the manufacture remains in the polyisobutylene polymer to cause coloring and muddiness, so that the curing of a photocurable composition becomes insufficient in some cases. Therefore, it is necessary to sufficiently remove an auxiliary material used in the manufacture and by-products from the polyisobutylene polymer, and it may be desirable that the polyisobutylene polymer is colorless and transparent.

On the other hand, as described in the patent documents, the polyisobutylene polymer having the colorless and the transparency can be prepared by repeating purification with reprecipitation using methanol. However, the handling of methanol becomes difficult due to high toxicity and deleterious property of methanol, so that use of methanol is hardly simple in industrial productivity.

That is, there is a strong demand to develop a method for producing a resin having excellent transparency under conditions of simple operation, high productivity, safety, low environment burden, small waste, in the manufacture of the polyisobutylene polymer having a (meth)acryloyl group.

One or more embodiments of the present invention provide a method for producing a (meth)acryloyl-terminated polyisobutylene polymer in which the auxiliary material used in the manufacture is easily removed, the burden of purification step and waste amount are decreased, and the transparency of the polymer is excellent.

The present inventors have accomplished these embodiments by preparing a halogen-terminated polyisobutylene under the presence of the Lewis acid catalyst in a given amount, and changing a halogen group into a (meth)acryloyl group at a terminal.

That is, embodiments of the present invention are as follows:

(1) A method for producing a (meth)acryloyl-terminated polyisobutylene polymer (A) represented by the following general formula (1)

[Chemical formula 1]

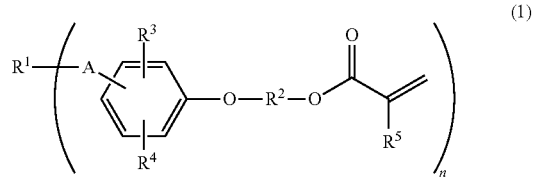

wherein $R^1$ represents a monovalent or multivalent aromatic hydrocarbon group, or a monovalent or multivalent aliphatic hydrocarbon group, A represents a polyisobutylene polymer, $R^2$ represents a divalent saturated hydrocarbon group having 2 to 6 carbons and having no heteroatom, each of $R^3$ and $R^4$ represents a hydrogen, a monovalent hydrocarbon having 1 to 20 carbons, or an alkoxy group, $R^5$ represents a hydrogen or a methyl group, and n represents natural number, the method contains:

a step 1 of polymerizing an isobutylene monomer under the presence of a Lewis acid catalyst to prepare a halogen-terminated polyisobutylene polymer (B) represented by the following general formula (2),

[Chemical formula 2]

wherein $R^1$, A, and n are the same as in the general formula (1), Z represents a chlorine, a bromine, an iodine, an acetoxy group, or a methoxy group, a step 2 of reacting the halogen-terminated polyisobutylene polymer (B) with a compound (C) having a halogen group and a phenoxy group as represented by the following general formula (3) under the presence of a Lewis acid catalyst to prepare a halogenated phenoxyalkyl-terminated polyisobutylene polymer (D) represented by the following general formula (4), wherein a ratio of a total molar amount of the Lewis acid catalyst to a molar amount of the compound (C) having a halogen group and a phenoxy group is 3.3 or less,

[Chemical formula 3]

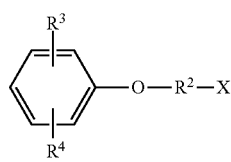
(3)

wherein $R^2$, $R^3$, and $R^4$ are the same as in the general formula (1), and X represents a chlorine, a bromine, or an iodine,

[Chemical formula 4]

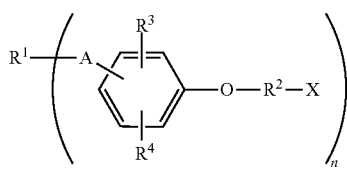
(4)

wherein $R^1$, $R^2$, $R^3$, $R^4$, A, and n are the same as in the general formula (1), and X is the same as in the general formula (3), a step 3 of reacting the halogenated phenoxyalkyl-terminated polyisobutylene polymer (D) with an acrylic acid compound (E) represented by the following general formula (5) to prepare the (meth)acryloyl-terminated polyisobutylene polymer (A),

[Chemical formula 5]

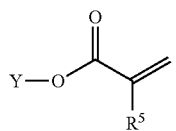
(5)

wherein $R^5$ represents a hydrogen or a methyl group, and Y represents a hydrogen, a lithium, a sodium, a potassium, a rubidium, or a cesium.

(2) The method according to (1), wherein a solvent used in the step 3 is at least one solvent selected from the group consisting of a halogenated hydrocarbon, a linear saturated hydrocarbon, a cyclic saturated hydrocarbon, and an aromatic hydrocarbon.

(3) The method according to (1) or (2), wherein the solvent used in the step 3 is the halogenated hydrocarbon, or a mixed solvent of the halogenated hydrocarbon and the linear saturated hydrocarbon.

(4) The method according to (1) or (2), wherein the solvent used in the step 3 is the aromatic hydrocarbon, or a mixed solvent of the aromatic hydrocarbon and the linear saturated hydrocarbon or the cyclic saturated hydrocarbon.

(5) The method according to any one of (1) to (4), wherein the step 3 is carried out under the presence of at least one compound selected from the group consisting of an ammonium salt, a phosphonium salt, and a crown ether.

(6) The method according to (5), wherein the ammonium salt comprises one or less of a methyl group as a substituent on a nitrogen atom.

(7) The method according to any one of (1) to (6), further adding an aprotic amphiphilic solvent in the step 3.

(8) The method according to any one of (1) to (7), wherein a content of water is 1000 ppm or less in the step 3.

According to the method for producing the (meth)acryloyl-terminated polyisobutylene polymer of one or more embodiments of the present invention, the (meth)acryloyl-terminated polyisobutylene polymer in which the auxiliary material used in the manufacture is easily removed, the burden of the purification step and the waste amount are decreased, and the transparency of the polymer is excellent can be obtained.

The (meth)acryloyl-terminated polyisobutylene polymer (A) of one or more embodiments of the present invention is represented by the following general formula (1).

[Chemical formula 6]

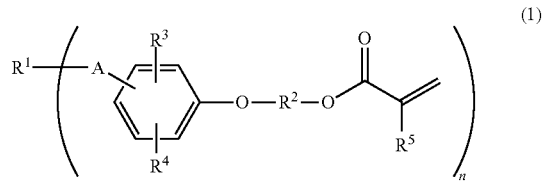
(1)

wherein $R^1$ represents a monovalent or multivalent aromatic hydrocarbon group, or a monovalent or multivalent aliphatic hydrocarbon group, A represents a polyisobutylene polymer, $R^2$ represents a divalent saturated hydrocarbon group having 2 to 6 carbons and having no heteroatom, each of $R^3$ and $R^4$ represents a hydrogen, a monovalent hydrocarbon having 1 to 20 carbons, or an alkoxy group, $R^5$ represents a hydrogen or a methyl group, and n represents natural number.

In the (meth)acryloyl-terminated polyisobutylene polymer (A) represented by the general formula (1), A may be a polyisobutylene polymer, a monomer constituting the polyisobutylene polymer includes an isobutylene as a main monomer, and the isobutylene may be copolymerized with other cationic polymerizable monomer.

The cationic polymerizable monomer includes olefins of 4 to 12 carbons, vinyl ethers, aromatic vinyl compounds, vinyl silanes, allyl silanes and the like. Concrete cationic polymerizable monomer includes isoprene, amylene, 1,3-butadiene, 1-buten, 2-buten, 2-methyl-1-buten, 3-methyl-1-buten, pentene, 4-methyl-1-pentene, hexene, vinyl cyclohexene, α-pinene, β-pinene, limonene, styrene, indene, α-methyl styrene, methoxy styrene, methyl styrene, trimethyl styrene, chlorostyrene, dichlorostyrene, methyl vinyl ether, ethyl vinyl ether, isobutyl vinyl ether, vinyl trichlorosilane, vinyl methyl dichlorosilane, vinyl dimethylchlorosilane, vinyldimethylmethoxysilane, vinyltrimethylsilane, divinyldichlorosilane, divinyldimethoxysilane, divinyldimethylsilane, 1,3-divinyl-1,1,3,3-tetramethyldisiloxane, trivinylmethylsilane, tetravinylsilane, allyltrichlorosilane, allylmethyldichlorosilane, allyldimethylchlorosilane, allyldimethylmethoxysilane, allyltrimethylsilane, diallyldichlorosilane, diallyldimethoxysilane, diallyldimethylsilane, and the like.

In the case where the other monomer copolymerizable with isobutylene is used, the other cationic polymerizable monomer may be contained in an amount of 50% by weight or less, or 30% by weight or less, or 10% by weight or less, per 100% by weight of a monomer constituting the isobutylene polymer.

$R^1$ of the general formula (1) is a monovalent or multivalent aromatic hydrocarbon group, or a monovalent or multivalent aliphatic hydrocarbon. A concrete example of the aromatic hydrocarbon includes alkyl-substituted benzene having free valency (hereinafter, this may be referred to as a bond) at a position of benzyl, such as cumyl group, m-dicumyl group, p-dicumyl group, 5-tert-butyl-1,3-dicumyl group, 5-methyl-1,3-dicumyl group, 1,3,5-tricumyl group. These are shown in the following formula.

[Chemical formula 7]

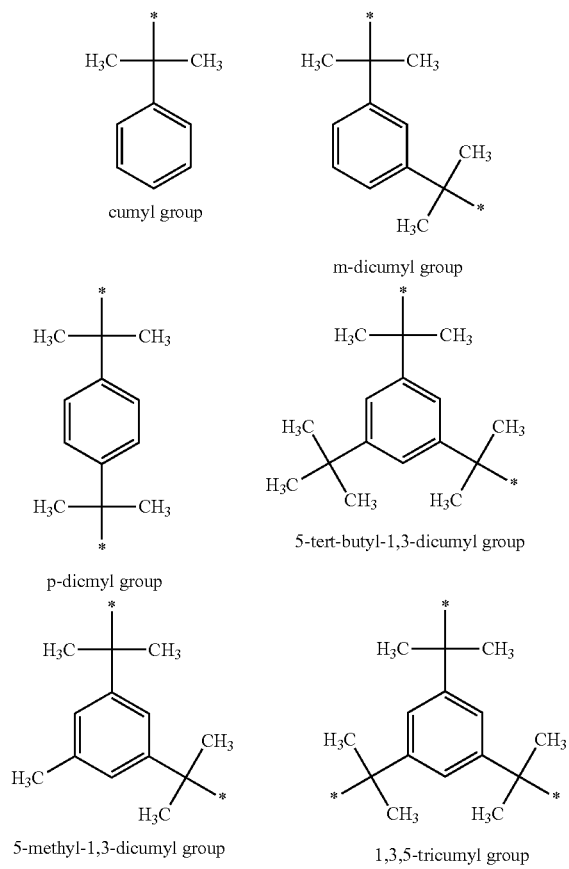

A concrete example of the aliphatic hydrocarbon includes an alkyl group or an alkylene group having 4 to 20 carbons and free valency on tertiary carbon such as $CH_3$ $(CH_3)_2CCH_2$ $(CH_3)_2C$—$(CH_3)_2CCH_2(CH_3)_2CCH(CH_3)_2C$—.

Among these, cumyl group, m-dicumyl group, p-dicumyl group, 5-tert-butyl-1,3-dicumyl group, 1,3,5-tricumyl group, $CH_3(CH_3)_2CCH_2(CH_3)_2C$—, —$(CH_3)_2CCH_2(CH_3)_2$ $CCH_2(CH_3)_2C$— may be particularly preferable in the viewpoint of the availability.

$R^2$ of the general formula (1) is a divalent saturated hydrocarbon having 2 to 6 carbons and no heteroatom. A concrete example of $R^2$ includes a linear saturated hydrocarbon group having free valency at both terminals such as —$CH_2CH_2$—, —$CH_2CH_2CH_2$—, —$CH_2CH_2CH_2CH_2$—, —$CH_2CH_2CH_2CH_2CH_2$—, —$CH_2CH_2CH_2CH_2CH_2CH_2$—. Among these, —$CH_2CH_2$—, —$CH_2CH_2CH_2$—, —$CH_2CH_2CH_2CH_2$— may be preferable in the viewpoint of the availability.

Each of $R^3$ and $R^4$ of the general formula (1) is a hydrogen, a monovalent hydrocarbon having 1 to 20 carbons, or an alkoxy group. A concrete example of $R^3$ and $R^4$ includes methyl group, ethyl group, propyl group, isopropyl group, butyl group, sec-butyl group, tert-butyl group, pentyl group, isopentyl group, neopentyl group, hexyl group, isohexyl group, neohexyl group, heptyl group, octyl group, isooctyl group, sec-octyl group, tert-octyl group, 2-ethylhexyl group, nonyl group, decanyl group, methoxy group, ethoxy group, propoxy group, isopropoxy group, butoxy group, sec-butoxy group, tert-butoxy group, pentyloxy group, isopentyloxy group, neopentyloxy group, hexyloxy group, isohexyloxy group, neohexyloxy group, heptyloxy group, octyloxy group, isooctyloxy group, sec-octyloxy group, tert-octyloxy group, 2-ethylhexyloxy group, nonyloxy group, decanyloxy group, and the like. Among these, the hydrogen may be preferable in the viewpoint of the availability and the reactivity.

$R^5$ of the general formula (1) is a hydrogen or a methyl group. $R^5$ may be hydrogen in the viewpoint of the availability and the reactivity.

n of the general formula (1) is natural number, and n may be 1 to 4 in the viewpoint of the attainment of sufficient strength, durability, and gelation rate in the case of the preparation of the crosslinking polymer from the crosslinking reaction. In the case where n is 5 or more, the corresponding polymerization initiator is hardly available in some cases. n may be 1 to 3, or 2 to 3, or 2.

A molecular weight of the (meth)acryloyl-terminated polyisobutylene polymer (A) is not limited particularly. The (meth)acryloyl-terminated polyisobutylene polymer (A) may have a number average molecular weight measured by SEC (Size Exclusion Chromatography) of 400 to 500,000, or 1000 to 500000, or 1000 to 300000, or 5000 to 30000, or 8000 to 15000 in the viewpoint of the fluidity, and physical property of cured polymer.

When the (meth)acryloyl-terminated polyisobutylene polymer (A) has a number average molecular weight of less than 400, the hardness of the product obtained by curing a curable resin composition by the active energy ray is too much high, and the physical property of the cured product is hardly controlled. On the other hand, when the (meth)acryloyl-terminated polyisobutylene polymer (A) has a number average molecular weight of more than 500000, the fluidity and the workability are deteriorated in some cases.

The (meth)acryloyl-terminated polyisobutylene polymer (A) may have a molecular weight distribution, that is, weight average molecular weight Mw/number average molecular weight Mn of 2.0 or less, or 1.8 or less, or 1.5 or less, in the viewpoint of processing stability. The lower limit of the molecular weight distribution may be 1.1.

In one or more embodiments of the present invention, a method for producing a (meth)acryloyl-terminated polyisobutylene polymer (A) represented by the following general formula (1) contains: a step 1 of polymerizing an isobutylene monomer under the presence of a Lewis acid catalyst to prepare a halogen-terminated polyisobutylene polymer (B) represented by the following general formula (2),

[Chemical formula 8]

(2)

wherein $R^1$, A, and n are the same as in the general formula (1), Z represents a chlorine, a bromine, an iodine, an acetoxy group, or a methoxy group, a step 2 of reacting the halogen-terminated polyisobutylene polymer (B) with a compound (C) having a halogen group and a phenoxy group as represented by the following general formula (3) under the presence of a Lewis acid catalyst to prepare a halogenated phenoxyalkyl-terminated polyisobutylene polymer (D) represented by the following general formula (4), wherein a ratio of a total molar amount of the Lewis acid catalyst of the steps 1 and 2 to a molar amount of the compound (C) having a halogen group and a phenoxy group is 3.3 or less,

[Chemical formula 9]

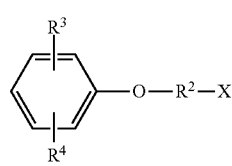
(3)

wherein $R^2$, $R^3$, and $R^4$ are the same as in the general formula (1), and X represents a chlorine, a bromine, or an iodine,

[Chemical formula 10]

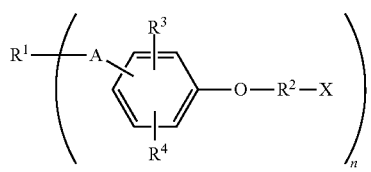
(4)

wherein $R^1$, $R^2$, $R^3$, $R^4$, A, and n are the same as in the general formula (1), and X is the same as in the general formula (3), a step 3 of reacting the halogenated phenoxyalkyl-terminated polyisobutylene polymer (D) with an acrylic acid compound (E) represented by the following general formula (5) to prepare the (meth)acryloyl-terminated polyisobutylene polymer (A),

[Chemical formula 11]

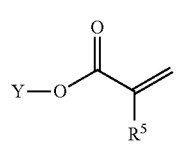
(5)

wherein $R^5$ represents a hydrogen or a methyl group, and Y represents a hydrogen, a lithium, a sodium, a potassium, a rubidium, or a cesium.

The method of producing the (meth)acryloyl-terminated polyisobutylene polymer according to one or more embodiments of the present invention is explained in the order of steps 1 to 3.

Step 1

In the step 1, an isobutylene monomer or the isobutylene monomer and the other cationic polymerizable monomer as mentioned above is polymerized under the presence of a Lewis acid catalyst to prepare a halogen-terminated polyisobutylene polymer (B) represented by the above general formula (2). Z of the general formula (2) represents a chlorine, a bromine, an iodine, an acetoxy group, or a methoxy group. Z may be the chlorine in the viewpoint of the availability and the stability of the compound.

The method of producing the halogen-terminated polyisobutylene polymer (B) may be cationic polymerization, or living cationic polymerization.

The detail of the living cationic polymerization applicable to one or more embodiments of the present invention is described as the synthetic reactions in a book edited by J. P. Kennedy et al., such as "Carbocationic Polymerization, John Wiley & Sons, 1982" and a book edited by K. Matyjaszewski et al., such as "Cationic Polymerizations, MarcelDekker, 1996".

Concretely, the halogen-terminated polyisobutylene polymer (B) is polymerized with a monomer component containing an isobutylene as a main monomer under the presence of a compound represented by the following general formula (6) as a polymerization initiator.

[Chemical formula 12]

(6)

wherein $R^1$, Z, and n are the same as in the general formula (2), the compound represented by the general formula (6) serves as the polymerization initiator to produce a carbocation under the presence of the Lewis acid and the like, and the carbocation works as an initial point of cationic polymerization. Examples of the compounds represented by the general formula (6) include the following compounds.

Aromatic compounds include (1-chloro-1-methylethyl)benzene [$C_6H_5C(CH_3)_2Cl$], 1,4-bis(1-chloro-1-methylethyl)benzene [1,4-Cl($CH_3$)$_2CC_6H_4C(CH_3)_2Cl$], 1,3-bis(1-chloro-1-methylethyl)benzene [1,3-Cl($CH_3$)$_2CC_6H_4C(CH_3)_2Cl$], 1,3,5-tris (1-chloro-1-methylethyl)benzene [1,3,5-($C_1C(CH_3)_2$)$_3C_6H_3$], 1,3-bis(1-chloro-1-methylethyl)-5-(tert-butyl)benzene [1,3-($C(CH_3)_2C_1$)$_2$-5-($C(CH_3)_3$)$C_6H_3$].

Aliphatic compounds include $CH_3(CH_3)_2CCH_2(CH_3)_2CCl$, $Cl(CH_3)_2CCH_2(CH_3)_2CCH_2(CH_3)_2CCl$. Among these, (1-chloro-1-methylethyl)benzene, 1,3-bis(1-chloro-1-methylethyl)benzene, 1,4-bis(1-chloro-1-methylethyl)benzene, 1,3-bis(1-chloro-1-methylethyl)-5-(tert-butyl)benzene, 1,3,5-tris (1-chloro-1-methylethyl)benzene, $CH_3(CH_3)_2CCH_2$ $(CH_3)_2CCl$, $Cl(CH_3)_2CCH_2$ $(CH_3)_2CCH_2$ $(CH_3)_2CCl$ may be preferably used.

Among these, 1,4-bis(1-chloro-1-methylethyl)benzene, and 1,3,5-tris(1-chloro-1-methylethyl)benzene may be particularly preferable.

(1-chloro-1-methylethyl)benzene is referred to as cumylchloride, bis(1-chloro-1-methylethyl)benzene is referred to as bis (α-chloroisopropyl)benzene, bis(2-chloro-2-propyl)benzene, or, dicumylchloride, and tris (1-chloro-1-methylethyl)benzene is referred to as tris(α-chloroisopropyl)benzene, tris(2-chloro-2-propyl)benzene, or tricumylchloride.

(Lewis Acid Catalyst)

Lewis acid catalyst coexists in the case of the manufacture of the halogen-terminated polyisobutylene polymer (B). The Lewis acid catalyst may be those usable in cationic polymerization. Metal halides such as $TiCl_4$, $TiBr_4$, $BCl_3$, $BF_3$, $BF_3 \cdot OEt_2$, $SnCl_4$, $SnBr_4$, $SbCl_5$, $SbBr_5$, $SbF_5$, $WCl_6$, $TaCl_5$, $VCl_5$, $FeCl_3$, $FeBr_3$, $ZnCl_2$, $ZnBr_2$, $AlCl_3$, $AlBr_3$, organometal halides such as $Et_2AlCl$, $Me_2AlCl$, $EtAlCl_2$, $MeAlCl_2$, $Et_2AlBr$, $Me_2AlBr$, $EtAlBr_2$, $MeAlBr_2$, $Et_{1.5}AlCl_{1.5}$, $Me_{1.5}AlCl_{1.5}$, $Et_{1.5}AlBr_{1.5}$, $Me_{1.5}AlBr_{1.5}$ can be used suitably. Among these, $TiCl_4$, $BCl_3$, and $SnCl_4$ may be preferable in the viewpoint of the capability of the catalyst and ease of industrial availability, and $TiCl_4$ may be particularly preferable in the viewpoint of the catalyst activity and the availability.

An amount of the Lewis acid catalyst is not limited particularly, and can be set according to the reactivity of the monomer and the concentration of the polymerization. As molar equivalents indicating a rate of a molar amount of the Lewis acid catalyst to 1 molar amount of polymerization initiator represented by the general formula (6), for example, 0.01 to 300 molar equivalents or 0.05 to 200 molar equivalents can be used. In one or more embodiments of the present invention, the Lewis acid catalyst can be used in an amount of 100 molar equivalents or less, or 50 molar equivalents or less, or 10 molar equivalents or less, or 5 molar equivalents or less per 1 molar of the polymerization initiator.

(Electron Donor)

If necessary, an electron donor can coexist in the manufacture of the halogen-terminated polyisobutylene polymer (B). The electron donor has effect of stabilizing carbocation during cationic polymerization, so that a polymer having narrowed molecular weight distribution and controlled structure can be produced by the addition of the electron donor. The usable electron donor is not limited particularly, and includes pyridines, amines, amides, sulfoxides, esters, or metal compounds having oxygen atom bonded to metal atom.

The electron donor may be those having donor number of 15 to 60 and the donor number is defined as a parameter indicating strength of electron donor of various compounds. The electron donor includes 2,6-di-t-butylpyridine, 2-t-butylpyridine, 2,4,6-trimethylpyridine, 2,6-dimethylpyridine, 2-methylpyridine, pyridine, diethylamine, trimethylamine, triethylamine, tributylamine, N,N-dimethylaniline, N,N-dimethylformamide, N,N-dimethylacetamide, N.N-diethylacetamide, dimethylsulfoxide, diethylether, methyl acetate, ethyl acetate, trimethyl phosphate, hexamethyl phosphoric triamide, titanium alkoxides such as titanium (III) methoxide, titanium (IV) methoxide, titanium (IV) isopropoxide, titanium (IV) butoxide; aluminium alkoxides such as aluminium triethoxide, and aluminium tributhoxide. The electron donor may be 2,6-di-t-butylpyridine, 2,6-dimethylpyridine, 2-methylpyridine, pyridine, diethylamine, trimethylamine, triethylamine, N,N-dimethylformamide, N,N-dimethylacetamide, dimethylsulfoxide, titanium (IV) isopropoxide, titanium (IV) butoxide and the like. The donor number of various materials is disclosed in "Donor and Acceptor" by V. Gutman (Otaki, Okada translation), Gakkai Shuppan Center (Ltd.), 1983. Among these, the electron donor may be 2-methyl pyridine, 2,6-dimethylpyridine, and triethylamine in the viewpoint of remarkable addition effects.

The electron donor may be used in an amount of, for example, 0.01 to 50 times molar, or 0.1 to 30 times molar, or 0.10 to 10 times molar, or 0.10 to 1 time molar per 1 molar of the polymerization initiator.

The halogen-terminated polyisobutylene polymer (B) can be polymerized in an organic solvent, if necessary. The organic solvent which does not essentially inhibit cationic polymerization can be used without limitation. The concrete organic solvent includes halogenated hydrocarbons such as halogenated alkanes such as methyl chloride, dichloromethane, chloroform, ethyl chloride, dichloroethane, n-propylchloride, n-butylchloride, n-pentylchloride, n-hexylchloride, n-heptylchloride, n-octylchloride, halogenated arenes such as chlorobenzene; aromatic hydrocarbons such as alkylbenzenes such as benzene, toluene, xylene, ethylbenzene, propylbenzene, butylbenzene; linear saturated hydrocarbons such as linear aliphatic hydrocarbons such as ethane, propane, butane, pentane, hexane, heptane, octane, nonane, decane, branched aliphatic hydrocarbons such as 2-methylpropane, 2-methylbutane, 2,3,3-trimethylpentane, 2,2,5-trimethylhexane; cyclic aliphatic hydrocarbons such as cyclohexane, methylcyclohexane, ethylcyclohexane; paraffin oil obtained by hydrogenated-refining petroleum fractions.

These solvents can be used individually or in the combination of two or more solvents according to balance between the reactivity of a monomer constituting the isobutylene polymer and the solubility of a produced polymer. In addition, when a solvent used in the step 1 is non-water soluble, or the solvent is not water soluble or not amphiphilic, many solvents may be used in the step 2 and the step 3. Therefore, among preferred solvents of the step 2 and the step 3 as set forth below, the non-water soluble solvent may be used as a solvent in the step 1. In addition, the same non-water soluble solvent may be used in the step 1, the step 2, and the step 3. In the step 1, an amount of the solvent may be determined such that a concentration of a polymer is, for example, 1 to 50 wt %, or 5 to 35 wt % in the viewpoint of the viscosity of a solution containing a polymer and ease of the heat removal.

In the polymerization, each of components is mixed under cooling, for example, at a temperature of from −100° C. or more to less than 0° C. In order to balance energy cost and the stability of polymerization, the temperature of the polymerization may be −30° C. to −80° C. The above temperature means a temperature of a reaction solution.

Step 2

In the step 2, the halogen-terminated polyisobutylene polymer (B) obtained in the step 1 is reacted with a compound (C) having a halogen group and a phenoxy group as represented by the general formula (3) under the presence of the Lewis acid catalyst, to prepare a halogenated phenoxyalkyl-terminated polyisobutylene polymer (D) represented by the general formula (4).

A concrete example of a compound (C) having a halogen group and a phenoxy group includes 2-phenoxyethyl chloride, 3-phenoxypropyl chloride, 4-phenoxybutyl chloride, 5-phenoxypentyl chloride, 6-phenoxyhexyl chloride, 2-phenoxyethyl bromide, 3-phenoxypropyl bromide, 4-phenoxybutyl bromide, 5-phenoxypentyl bromide, 6-phenoxyhexyl bromide, 2-phenoxyethyl iodide, 3-phenoxypropyl iodide, 4-phenoxybutyl iodide, 5-phenoxypentyl iodide, 6-phenoxyhexyl iodide, 2-(2-methylphenoxy)ethyl chloride, 3-(2-methylphenoxy)propyl chloride, 4-(2-methylphenoxy)butyl chloride, 5-(2-methylphenoxy)pentyl chloride, 6-(2-methylphenoxy)hexyl chloride, 2-(2-methylphenoxy)ethyl bromide, 3-(2-methylphenoxy)propyl bromide, 4-(2-methylphenoxy)butyl bromide, 5-(2-methylphenoxy)pentyl bromide, 6-(2-methylphenoxy)hexyl bromide, 2-(3-methylphenoxy)ethyl chloride, 3-(3-methylphenoxy)propyl chloride, 4-(3-methylphenoxy)butyl chloride, 5-(3-methylphenoxy)pentyl chloride, 6-(3-methylphenoxy)hexyl chloride, 2-(3-methylphenoxy)ethyl bromide, 3-(3-methylphenoxy)propyl bromide, 4-(3-methylphenoxy)butyl bromide, 5-(3-methylphenoxy)pentyl bromide, 6-(3-methylphenoxy)hexyl bromide, 2-(4-methylphenoxy)ethyl chloride, 3-(4-methylphenoxy)propyl chloride, 4-(4-methylphenoxy)butyl chloride, 5-(4-methylphenoxy)pentyl chloride, 6-(4-methylphenoxy)hexyl chloride, 2-(4-methylphenoxy)ethyl bromide, 3-(4-methylphenoxy)propyl bromide, 4-(4-methylphenoxy)butyl bromide, 5-(4-methylphenoxy)pentyl bromide, 6-(4-methylphenoxy)hexyl bromide and the like.

Among these, 2-phenoxyethyl chloride, 3-phenoxypropyl chloride, 4-phenoxybutyl chloride, 5-phenoxypentyl chloride, 6-phenoxyhexyl chloride, 2-phenoxyethyl bromide, 3-phenoxypropyl bromide, 4-phenoxybutyl bromide, 5-phenoxypentyl bromide, and 6-phenoxyhexyl bromide may be preferable in the viewpoint of the availability and the reactivity, and 2-phenoxyethyl bromide, 3-phenoxypropyl bromide, 4-phenoxybutyl bromide, 5-phenoxypentyl bromide, and 6-phenoxyhexyl bromide may be more preferable in the viewpoint of the reactivity of introducing an acryloyl group.

The compound (C) having a halogen group and a phenoxy group can be used in an optional amount such that an acryloyl group is introduced in a desirable number ("introduced number of acryloyl group"). For example, the compound (C) may be used 0.01 to 100 times molar, or 0.1 to 30 times molar, or 0.5 to 10 times molar, per 1 molar of polymerization initiator.

In the case where the halogen-terminated polyisobutylene polymer (B) represented by the general formula (2) and obtained by cationic polymerization is reacted with the compound (C) having a halogen group and a phenoxy group as represented by the general formula (3), the Lewis acid catalyst is used as a catalyst.

The Lewis acid catalyst is not limited particularly as long as the Lewis acid catalyst is a general Lewis acid. Lewis acid catalyst may be exemplified by $TiCl_4$, $Ti(OiPr)_4$, $TiBr_4$, $AlCl_3$, $AlBr_3$, $Et_2AlCl$, $Me_2AlCl$, $EtAlCl_2$, $MeAlCl_2$, $Et_2AlBr$, $Me_2AlBr$, $EtAlBr_2$, $MeAlBr_2$, $Et_{1.5}AlCl_{1.5}$, $Me_{1.5}AlCl_{1.5}$, $Et_{1.5}AlBr_{1.5}$, $Me_{1.5}AlBr_{1.5}$, $BCl_3$, $BF_3$, $BF_3(OEt_2)$, $GaCl_3$, $FeCl_3$, $FeBr_3$, $SnCl_4$, $SnBr_4$, $SbCl_5$, $SbBr_5$, $SbF_5$, $WCl_6$, $TaCl_5$, $VCl_5$, $ZnCl_2$, $ZnBr_2$ in the viewpoint of high reactive activity and good selectivity.

$TiCl_4$, $Ti(OiPr)_4$, $TiBr_4$, $AlCl_3$, $AlBr_3$, $Et_2AlCl$, $Me_2AlCl$, $EtAlCl_2$, $MeAlCl_2$, $Et_2AlBr$, $Me_2AlBr$, $EtAlBr_2$, $MeAlBr_2$, $Et_{1.5}AlCl_{1.5}$, $Me_{1.5}AlCl_{1.5}$, $Et_{1.5}AlBr_{1.5}$, $Me_{1.5}AlBr_{1.5}$, $BCl_3$, $BF_3$, $BF_3(OEt_2)$, $GaCl_3$, $FeCl_3$, $FeBr_3$, $SnCl_4$, $ZnCl_2$, $ZnBr_2$ may be particularly preferable in the viewpoint of the industrial availability and the reactivity. In addition, it may be preferable that a Lewis acid catalyst used in the step 1 and a Lewis acid catalyst used in the step 2 are same in the viewpoint of the ease of the operation and the treatment of waste.

In the step 2 in which the halogenated phenoxyalkyl-terminated polyisobutylene polymer (D) represented by the general formula (4) is prepared from the halogen-terminated polyisobutylene polymer (B) represented by the general formula (2) and the compound (C) having a halogen group and a phenoxy group as represented by the general formula (3), a ratio of a total molar amount of the Lewis acid catalyst of the steps 1 and 2 to a molar amount of the compound (C) may be 3.3 or less, or 1.0 or more and 3.0 or less.

When the ratio is over 3.3, it is hard to effectively remove the Lewis acid catalyst due to high concentration of the Lewis acid catalyst in the reaction system even if purification such as hydrolysis is carried out in work-up step, so that the obtained polymer becomes colored and/or clouded.

This reason is that the remove of the catalyst is easily inhibited in the work-up step in the case where the Lewis acid catalyst is used in a large amount.

Some water added for deactivating the Lewis acid catalyst is incorporated in an organic phase. In the case where a large amount of the Lewis acid catalyst is used, the Lewis acid catalyst is partly hydrolyzed and may turn to be amphiphilic. As a result, the Lewis acid catalyst becomes hard to extract into aqueous phase and may work as a surfactant to cover the surface of water droplets, resulting in the stable hydration state in even the organic phase. These mechanisms are thought to retard extraction of the Lewis acid catalyst from organic phase to aqueous phase.

In the case where the Lewis acid catalyst is used in a large amount like Comparative Example 1, an amount of aqueous phase to be removed is 100% by weight or less in many cases, and an amount of aqueous phase to be removed is 50 to 90% by weight per 100% by weight of pure water to be added in the work-up step. This means that 10 to 50% by weight of water added is incorporated in the organic phase, and indicates results supporting the above theory. In addition, the organic phase becomes clouded at that time, the hydrolysis of the Lewis acid catalyst is proceeded to some degree and is not totally completed. The results also support the above theory.

When the halogen-terminated polyisobutylene polymer (B) obtained by cationic polymerization is reacted with the compound (C) having a halogen group and a phenoxy group, a mixture composed of the halogen-terminated polyisobutylene polymer (B) and the compound (C) having a halogen group and a phenoxy group has a sufficiently low viscosity and can be effectively stirred and mixed to proceed the reaction, so that the mixture can be reacted under the condition that the solvent is not used.

On the other hand, a solvent can be used in the reaction, and a solvent optionally selected from the halogenated hydrocarbon, the aromatic hydrocarbon, and the aliphatic hydrocarbon can be used individually or in the mixture of two or more solvents. The solvent for reaction can be selected from the same solvent as classified and exemplified in the step 1. With regard to the selection of solvents, the halogenated hydrocarbon includes a halogenated alkane, and particularly, one or more solvents selected from methylene chloride, chloroform, 1,1-dichloroethane, 1,2-dichloroethane, n-propyl chloride, n-butyl chloride may be preferable in the viewpoint of the solubility and the reactivity under the conditions of polymerizing a polymer. Similarly, the aromatic hydrocarbon may be toluene, and the aliphatic hydrocarbon may be one or more hydrocarbons selected from butane, pentane, hexane, heptane, octane, nonane, decane, cyclohexane, methyl cyclohexane, ethyl cyclohexane. In addition, when the solvent used in the step 2 is non-water soluble, that is, the solvent is not water soluble or amphiphilic, many solvents may be used as a solvent of the step 3 as set forth below. Among preferred solvents in the step 3 as set forth below, a non-water soluble solvent may be used as a preferred solvent in the step 2. The same non-water soluble solvents may be used in the steps 2 and 3.

As the solvent for reaction in which the halogenated hydrocarbon concerning bad influence for environment is not used, toluene, hexane, methyl cyclohexane, ethyl cyclohexane, or a mixture thereof is used to easily accomplish the manufacture of the halogenated phenoxyalkyl-terminated polyisobutylene polymer (D).

When the halogen-terminated polyisobutylene polymer (B) is reacted with the compound (C) having a halogen group and a phenoxy group, a temperature may be 100° C. or less, or 0° C. or less. When the temperature for the reaction is more than 100° C., the rate of introducing the compound (C) having a halogen group and a phenoxy group is decreased in some cases. The lower limit of the temperature for the reaction is about −100° C.

When the halogen-terminated polyisobutylene polymer (B) is reacted with the compound (C) having a halogen group and a phenoxy group, the halogen-terminated polyisobutylene polymer (B) obtained by isolation may be reacted with the compound (C) having a halogen group and a phenoxy group, or during the polymerization of the halogen-terminated polyisobutylene polymer (B) or after substantially completing the polymerization of the halogen-terminated polyisobutylene polymer (B), the compound (C) having a halogen group and a phenoxy group can be added to a polymerization system to react with the halogen-terminated polyisobutylene polymer (B).

In the cased of the latter, the timing for adding the compound (C) having a halogen group and a phenoxy group is determined by the conversion rate of the isobutylene monomer as measured by gas chromatography. The timing for adding the compound (C) may be 50% or more of the conversion rate, or 80% or more of the conversion rate, and 95% or more of the conversion rate.

Step 3

In the step 3, the halogenated phenoxyalkyl-terminated polyisobutylene polymer (D) obtained in the step 2 is reacted with an acrylic acid compound (E) represented by the general formula (5) to prepare the (meth)acryloyl-terminated polyisobutylene polymer W.

A concrete example of the acrylic acid compound (E) includes acrylic acid; acrylic acid alkaline metal salts such as lithium acrylate, sodium acrylate, potassium acrylate, rubidium acrylate, and cesium acrylate; methacrylic acid; methacrylic acid alkaline metal salts such as lithium methacrylate, sodium methacrylate, potassium methacrylate, rubidium methacrylate, and cesium methacrylate. These can be used individually or in the combination of two or more acrylic acid compounds.

Among these, lithium acrylate, sodium acrylate, potassium acrylate, lithium methacrylate, sodium methacrylate, potassium methacrylate may be preferable in the viewpoint of the availability, cost, and the reactivity.

The acrylic acid compound (E) can be used in an optionally amount in order to introduce a desired number of an acryloyl group. For example, the acrylic acid compound (E) may be used in an amount of 0.01 to 500 times molar, or 0.1 to 300 times molar, or 0.5 to 100 times molar, or 1.5 to 30 times molar per 1 molar of the polymerization initiator.

In one or more embodiments of the present invention, when the (meth)acryloyl-terminated polyisobutylene polymer (A) is prepared by reacting the halogenated phenoxyalkyl-terminated polyisobutylene polymer (D) and the acrylic acid compound (E) such as acrylic acid, methacrylic acid, and a mixture thereof, a various basic compound may be added in order to promote a reaction.

The basic compound to be added includes amines such as ammonium, diethylamine, triethylamine, di-n-propyl amine, tri-n-propylamine, di-i-propyl amine, tri-i-propyl amine, di-n-butyl amine, tri-n-butyl amine, di-i-butyl amine, tri-i-butyl amine, nitrogen-containing compounds such as pyridine, α-picoline, β-picoline, aniline, methylaniline, dimethylaniline, N,N-dimethylaniline, 1,8-diazabicyclo[5.4.0]-7-undecene, 1,5-diazabicyclo[4.3.0]-5-nonene, 1,1,3,3-tetramethylguanidine, 1-phenylguanidine, o-tolylguanidine; hydroxides such as lithium hydroxide, sodium hydroxide, potassium hydroxide, rubidium hydroxide, cesium hydroxide; carbonates such as lithium carbonate, sodium carbonate, potassium carbonate, rubidium carbonate, cesium carbonate; bicarbonates such as lithium bicarbonate, sodium bicarbonate, potassium bicarbonate, rubidium bicarbonate, cesium bicarbonate; alkaline metal hydrides such as lithium hydride, sodium hydride; organic lithium compounds such as butyl lithium, lithium diisopropylamide and the like.

On the other hand, when the (meth)acryloyl-terminated polyisobutylene polymer (A) is prepared by reacting the halogenated phenoxyalkyl-terminated polyisobutylene polymer (D) and the acrylic acid compound (E) such as the acrylic acid metal salts, the methacrylic acid metal salts, and a mixture thereof, the addition of the basic compound is not needed particularly.

In the step 3 in which the (meth)acryloyl-terminated polyisobutylene polymer (A) is prepared by reacting the halogenated phenoxyalkyl-terminated polyisobutylene polymer (D) and the acrylic acid compound (E), it may be preferable to use the solvent for reaction. An example of the solvent includes a halogenated hydrocarbon, a linear saturated hydrocarbon, a cyclic saturated hydrocarbon, and an aromatic hydrocarbon.

A concrete example of the halogenated hydrocarbon includes halogenated alkanes such as methyl chloride, dichloromethane, chloroform, ethyl chloride, dichloroethane, n-propy chloride, n-butyl chloride, n-pentyl chloride, n-hexyl chloride, n-heptyl chloride, n-octyl chloride, and chlorobenzene.

A concrete example of the linear saturated hydrocarbon includes ethane, propane, butane, pentane, hexane, heptane, octane, nonane, decane, 2-methylpropane, 2-methylbutane, 2,3,3-trimethylpantane, 2,2,5-trimethylhexane, and the like.

A concrete example of the cyclic saturated hydrocarbon includes cyclohexane, methylcyclohexane, ethylcyclohexane, and the like.

A concrete example of the aromatic hydrocarbon includes benzene, toluene, xylene, ethylbenzene, propylbenzene, butylbenzene, and the like.

These solvents can be used individually or in the combination of two or more solvents by considering the balance between the polymerization property of a monomer constituting the isobutylene polymer and the solubility of the polymer produced.

The halogenated hydrocarbon or the mixed solvents of the halogenated hydrocarbon and the linear saturated hydrocarbon may be preferable in the viewpoint of the solubility and the reactivity of the reactant. In addition, the aromatic hydrocarbon or the mixed solvents of the aromatic hydrocarbon and the linear saturated hydrocarbon or the cyclic saturated hydrocarbon may be preferable in the viewpoint of the solubility and the reactivity of the reactant and the decreased burden to environment of the non-halogen solvent.

n-propyl chloride, n-butyl chloride, n-pentyl chloride, n-hexyl chloride, pentane, hexane, heptane, cyclohexane, methylcyclohexane, ethylcyclohexane, toluene, xylene, ethylbenzene, and the combination of two or more solvents of these solvents may be preferable in the viewpoint of the availability, the reactivity, and the ease of the handling. n-butyl chloride, hexane, methylcyclohexane, ethylcyclohexane, toluene, and the combination of two or more solvents of these solvents may be more preferable in the viewpoint of control of the solubility and the reactivity of the resin.

A used amount of the solvent may be selected such that the concentration of the polymer is, for example, 1 to 50 wt %, or 5 to 35 wt %, by considering the viscosity of the polymer solution, the solubility of the substrate, and the ease of the heat removal.

The reaction may be carried out at the temperature of −100° C. to 150° C., or 0° C. to 150° C. in the viewpoint of energy cost, or 10° C. to 100° C. in the viewpoint of the productivity. The temperature means a temperature of a reaction solution.

In the step 3 in which the (meth)acryloyl-terminated polyisobutylene polymer (A) is prepared by reacting the halogenated phenoxyalkyl-terminated polyisobutylene polymer (D) and the acrylic acid compound (E), a compound referred to as a phase transfer catalyst such as an ammonium salt, a phosphonium salt, a crown ether may be made to coexist in the system. Among these, the phase transfer catalyst having an ammonium salt and one or less of a methyl group or no methyl group as a substituent on nitrogen atom may be more preferable in the viewpoint of high solubility to the organic phase and high catalytic activity.

In one or more embodiments of the present invention, the ammonium salt in which Q is a nitrogen atom and the phosphonium salt in which Q is a phosphorus atom are a compound represented by the following general formula (7).

[Chemical formula 13]

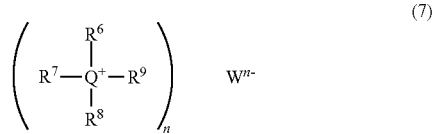

(7)

wherein Q represents a nitrogen atom or a phosphorus atom. When Q is the nitrogen atom, the general formula (7) means an ammonium salt. When Q represents the phosphorus atom, the general formula (7) means a phosphonium salt. Each of $R^6$, $R^7$, $R^8$, and $R^9$ represents a monovalent hydrocarbon having 1 to 20 carbons. $R^6$, $R^7$, $R^8$, and $R^9$ may be different each other, or two or more groups may be the same group. n represents natural number. $W^{n-}$ represents fluoride ion, chloride ion, bromide ion, iodide ion, hydroxide ion, hydrogen sulfate ion, hydrogen phosphate ion, hydrogen carbonate ion, nitrate ion, tetrafluoroborate ion, hexafluoroborate ion, acetic acid ion, trifluoromethane sulfonate ion, p-toluene sulfonate ion, or methane sulfonate ion.

Concrete examples of the ammonium salt and the phosphonium salt contain very numerous examples, all examples cannot be described, and one example contains the following compounds and the like.

Concrete examples of the ammonium salt include organic ammonium halides such as tetrabutylammmonium chloride, tetrabutylammmonium bromide, tetrabutylammonium iodide, tetrapentylammonium chloride, tetrapentylammonium bromide, tetrahexylammonium chloride, tetrahexylammonium bromide, tetraoctylammonium chloride, tetraoctylammonium bromide, tetradecylammonium chloride, tetradecylammonium bromide, tetradodecylammonium chloride, tetradodecylammonium bromide, methyltrioctylammonium chloride, didecyldimethylammochium bromide, di stearyldimethylammonium bromide, methyltrioctylammonium bromide, trimethyloctadecylammonium chloride, decyltrimethylammonium bromide; tetrabutylammonium hydrogen sulfate salt, methyltrioctylammobnium hydrogen sulfate salt, tetrabutylammonium acetate, bis(tetrabutylammonium)sulfate, and the like.

Concrete examples of the phosphonium salt include organic halogen compounds such as tetrabutylphosphonium chloride, tetrabutylphosphonium bromide, tetrabutylphosphonium iodide, tetrapentylphosphonium chloride, tetrapentylphosphonium bromide, tetrahexylphosphonium chloride, tetrahexylphosphonium bromide, tetraoctylphosphonium chloride, tetraoctylphosphonium bromide, tetradecylphosphonium chloride, tetradecylphosphonium bromide, tetradodecylphosphonium chloride, tetradodecylphosphonium bromide, tributyldodecylphosphonium bromide, methyltrioctylphosphonium chloride, didecyldimethylphosphonium bromide, distearyldimethylphosphonium bromide, methyltrioctylphosphonium bromide, tetrabutylphosphonium hydrogen sulfate salt, methyltrioctylphosphonium hydrogen sulfate salt, tetrabutylphosphonium acetate, bis(tetrabutylphosphonium)sulfate, and the like.

Examples of the crown ether used include 1-aza-15-crown 5-ether, 1-aza-18-crown 6-ether, 1-aza-12-crown 4-ether, benzo-15-crown 5-ether, benzo-18-crown 6-ether, benzo-12-crown 4-ether, 12-crown 4-ether, 15-crown 5-ether, 18-crown 6-ether, 24-crown 8-ether, dibenzo-18-crown 6-ether, dibenzo-24-crown 8-ether, dibenzo-30-crown 10-ether, dibenzo-21-crown 7-ether, dibenzo-15-crown 5-ether, dicyclohexyl-18-crown 6-ether, dicyclohexyl-24-crown 8-ether, and the like.

Among these, tetrabutylammonium chloride, tetrabutylammonium bromide, tetrapentylammonium chloride, tetrapentylammonium bromide, tetrahexylammonium chloride, tetrahexylammonium bromide, tetraoctylammonium chloride, tetraoctylammonium bromide, methyltrioctylammonium chloride, and methyltrioctylammonium bromide may be preferable in the viewpoint of the availability, ease of handling, cost, and effects of promoting reaction.

An amount added of the phase transfer catalyst such as the ammonium salt, the phosphonium salt, and the crown ether may be 0.001 to 100 parts by weight, or 0.01 to 50 parts by weight, or 0.1 to 30 parts by weight, per a molar amount of polymerization initiator residue contained in the halogenated phenoxyalkyl-terminated polyisobutylene polymer (D), or, a molar amount of a resin obtained by living polymerization. In the case of less than 0.001 parts by weight, effects of promoting reaction are insufficient in some cases. On the other hand, in the case of more than 100 parts by weight, the cost for the manufacture becomes higher, and the removal of the phase transfer catalyst after the manufacture becomes difficult in some cases.

In the step 3 in which the (meth)acryloyl-terminated polyisobutylene polymer (A) is prepared by reacting the halogenated phenoxyalkyl-terminated polyisobutylene polymer (D) and the acrylic acid compound (E), it may be preferable to add an aprotic amphiphilic solvent to the non-water soluble solvent such as the halogenated hydrocarbon, the linear saturated hydrocarbon, the cyclic saturated hydrocarbon, and the aromatic hydrocarbon as mentioned above.

Concrete examples of the aprotic amphiphilic solvent contain very numerous examples, all examples cannot be described, and one example of the industrially available compound includes amides such as N,N-dimethylformamide, N,N-dimethylacetamide; ureas such as 1,3-dimethyl-2-imidaxolidinone; sulfoxides such as dimethylsulfoxide, 1,3-propanesultone; ketones such as acetone, 2-butanone; ethers such as tetrahydrofuran, 1,2-dimethoxyethane, 1,3-dioxane, 1,4-dioxane; nitriles such as acetonitrile; phosphate derivatives such as hexamethylphosphoric triamide; nitrogen-containing aromatic compound such as pyridine, and the like.

An amount added of the aprotic amphiphilic solvent may be 0.01 to 1000 parts by weight, or 0.01 to 500 parts by weight, or 0.1 to 300 parts by weight, per 100 parts by weight of the halogenated phenoxyalkyl-terminated polyisobutylene polymer (D). In the case of less than 0.01 parts by weight, effects of promoting reaction are insufficient in some cases. On the other hand, in the case of more than 1000 parts by weight, the cost for the manufacture becomes higher, effects of promoting reaction are not obtained due to precipitation of the polymer during reaction, and the removal of the solvent after the manufacture becomes difficult in some cases.

The present inventors have found that a content of water affects a rate of reaction in the step 3 in which the (meth) acryloyl-terminated polyisobutylene polymer (A) is prepared by reacting the halogenated phenoxyalkyl-terminated polyisobutylene polymer (D) and the acrylic acid compound (D).

In general, in reaction of multiphases, the reaction is carried out in two phase containing the organic phase and the aqueous phase in order to improve the collision frequency of reactants in many cases. The present inventors have found that the smaller an amount of water, the faster the reaction proceeds in the acryloylated reaction.

The reason is not definite at all and is as follows. When the water molecule is present in the system, the acrylic acid compound (E) is hydrated and the nucleophilicity thereof is lowered, thereby lowering the reaction rate and the phase transfer catalyst is hydrated to lower the catalytic activity of the reaction, so that the reaction rate is decreased.

In one or more embodiments of the present invention, a content of water may be 10% by weight or less, or 1% by weight or less, or 1000 ppm or less, per 100% by weight of the solvent. When the content of water is more than 10% by weight in the system, the reaction is not completed within the time appropriate to the industrial productivity, and the reaction may be inhibited based on the above mechanism and the like.

The means to decrease the content of water includes purification of distillation, the addition of desiccants such as molecular sieve, calcium chloride, aluminium oxide, anhydrous calcium sulfate, magnesium sulfate, silica gel, and sodium sulfate.

The present application claims the benefit of priority to Japanese Patent Application Number 2015-242462 filed on Dec. 11, 2015. The entire contents of the specification of Japanese Patent Application Number 2015-242462 filed on Dec. 11, 2015 are hereby incorporated by reference.

EXAMPLES

Next, one or more embodiments of the present invention will be described in detail with reference to Examples, but the present invention is not limited thereto. In addition, each of measurement method and evaluation method is explained before describing Example.
(Molecular Weight Measurement)

In the following Examples, "number average molecular weight", "weight average molecular weight" and "molecular weight distribution (ratio of weight average molecular weight to number average molecular weight)" were calculated by standard polystyrene conversion method using size permeation chromatography (SEC). In this measurement, LCModule 1 manufactured by Waters was used as an SEC system, a column filled with a polystyrene crosslinked gel (Shodex GPCK-804; manufactured by Showa Denko K.K.) was used as a GPC column (stationary phase), and chloroform was used as a mobile phase.
(APHA Measurement: Hazen Color Number)

The Hazen color number was measured according to ISO 6721-2: 2004 to obtain the APHA value. For the measurement, a SC-P spectrophotometer manufactured by Suga Test Instruments Co., Ltd. was used.
(Number of Introduced (Meth)Acryloyl Group)

The number of (meth)acryloyl groups introduced at the end of the (meth) acryloyl-terminated polyisobutylene polymer was determined in the following manner. First, from the number average molecular weight Mn of the polymer determined by the above molecular weight measurement (GPC measurement), the number of protons derived from the methyl group in the polyisobutylene contained in one molecule of the polymer was determined. Next, $^1$H NMR measurement was carried out, and the peak integral value of the proton was determined from the NMR chart. The number of (meth)acryloyl groups introduced in one molecule of the polymer was determined by using the number and the peak integral value of protons and the peak integral value of the vinyl proton derived from the (meth)acryloyl group obtained from the NMR chart.
(Number of Halogenated Phenoxyalkyl Groups Introduced)

The number of halogenated phenoxyalkyl groups introduced at the end of the halogenated phenoxyalkyl-terminated polyisobutylene polymer was determined in the following manner. First, from the number average molecular weight Mn of the polymer determined by the above molecular weight measurement (GPC measurement), the number of protons derived from the methyl group in the polyisobutylene contained in one molecule of the polymer was determined. Next, $^1$H NMR measurement was carried out, and the peak integral value of the proton was determined from the NMR chart. Using the number and the peak integral value of protons and the peak integral value of the proton at the a position of the halogen group and the oxygen atom in the halogenated phenoxyalkyl group determined from the NMR chart, the number of halogenated phenoxyalkyl groups in one molecule of the polymer was determined.

Example 1

Production of Acryloyl-Terminated Polyisobutylene Polymer (Component P-1)

After replacing the inside of a 500 mL separable flask with nitrogen, 17 g of n-hexane (dried with molecular sieves) and 209 g of butyl chloride (dried with molecular sieves) were added, and a mixture was cooled to −70° C. while stirring under a nitrogen atmosphere. Subsequently, 140 mL (1.48 mol) of isobutylene, 2.00 g (8.65 mmol) of p-dicumyl chloride and 0.201 g (1.99 mmol) of triethylamine were added. After the reaction mixture was cooled to −70° C., 0.66 mL (6.06 mmol) of titanium tetrachloride was added to initiate polymerization. After the initiation of polymerization, the residual isobutylene concentration was measured by gas chromatography, and when the residual amount of isobutylene was less than 0.5%, 3.65 g (18.2 mmol) of 2-phenoxyethyl bromide (β-bromophenetole) and 3.79 mL (34.6 mmol) of titanium tetrachloride were added. After stirring at −75° C. for 3 hours, the reaction solution was poured into another separable flask that contains a mixture of 478 g of water and 265 g of a mixed solvent of n-hexane and butyl chloride (mixture ratio of n-hexane:butyl chloride=9:1, v/v) at 50° C. while stirring. Thereafter, the reaction mixture was kept stirred at 50° C. for 1 hour to deactivate the catalyst. After standing still for 30 minutes, the aqueous phase was discharged. Next, the organic phase was washed with 478 g of a 0.5 wt % sodium sulfate solution for 1 hour at 50° C. and then the mixture was stood still for next 30 minutes. Thereafter, the aqueous phase was taken out. The same procedure was repeated again to obtain the purified organic phase.

To this organic phase, 9.52 g (86.5 mmol) of potassium acrylate and 0.88 g (2.73 mmol) of tetrabutylammonium bromide were added and stirring was continued at 50° C. for 24 hours. Thereafter, the organic phase was washed with 478 g of deionized water at 50° C. three times to take out the purified organic phase.

To the organic phase, 0.18 g of 4-methoxyphenol was added, and the solvent was evaporated under reduced pressure to obtain an acryloyl-terminated polyisobutylene polymer P-1. The molecular weight (standard polystyrene) of P-1 was found to be number average molecular weight Mn of 11,998, molecular weight distribution Mw/Mn of 1.23, introduction number of acryloyl groups of 1.6, and APHA of 10.

Example 2

Production of Acryloyl-Terminated Polyisobutylene Polymer (Component P-2)

After replacing the inside of a 500 mL separable flask with nitrogen, 17 g of n-hexane (dried with molecular sieves) and 209 g of butyl chloride (dried with molecular sieves) were added, and a mixture was cooled to −70° C. while stirring under a nitrogen atmosphere. Subsequently, 140 mL (1.48 mol) of isobutylene, 2.00 g (8.65 mmol) of p-dicumyl chloride and 0.201 g (1.99 mmol) of triethylamine were added. After the reaction mixture was cooled to −70° C., 0.76 mL (6.92 mmol) of titanium tetrachloride was added to initiate polymerization. After the initiation of polymerization, the residual isobutylene concentration was measured by gas chromatography, and when the residual amount of isobutylene was less than 0.5%, 3.15 ml (19.9 mmol) of 3-phenoxypropyl bromide and 2.85 ml (26.0 mmol) of titanium tetrachloride were added. After stirring at −75° C. for 3 hours, the reaction solution was poured into another separable flask that contains a mixture of 478 g of water and 265 g of a mixed solvent of n-hexane and butyl chloride (mixture ratio of n-hexane:butyl chloride=9:1, v/v) at 50° C. while stirring. Thereafter, the reaction mixture was kept stirred at 50° C. for 1 hour to deactivate the catalyst. After standing still for 30 minutes, the aqueous phase was discharged. Next, the organic phase was washed with 478 g of a 0.5 wt % sodium sulfate solution for 1 hour at 50° C. and then the mixture was stood still for next 30 minutes. Thereafter, the aqueous phase was taken out. The same procedure was repeated again to obtain the purified organic phase.

To this organic phase, 9.52 g (86.5 mmol) of potassium acrylate and 0.88 g (2.73 mmol) of tetrabutylammonium bromide were added and stirring was continued at 50° C. for 24 hours. Thereafter, the organic phase was washed with 478 g of deionized water at 50° C. three times to take out the purified organic phase.

To this organic phase, 0.18 g of 4-methoxyphenol was added, and the solvent was evaporated under reduced pressure to obtain an acryloyl-terminated polyisobutylene polymer P-2. The molecular weight (standard polystyrene) of P-2 was found to be number average molecular weight Mn of 12,370, molecular weight distribution Mw/Mn of 1.26, introduction number of acryloyl groups of 1.6, and APHA of 20.

Example 3

Production of Acryloyl-Terminated Polyisobutylene Polymer (Component P-3)

After replacing the inside of a 500 mL separable flask with nitrogen, 17 g of n-hexane (dried with molecular sieves) and 209 g of butyl chloride (dried with molecular sieves) were added, and a mixture was cooled to −70° C. while stirring under a nitrogen atmosphere. Subsequently, 140 mL (1.48 mol) of isobutylene, 2.00 g (8.65 mmol) of p-dicumyl chloride and 0.201 g (1.99 mmol) of triethylamine were added. After the reaction mixture was cooled to −70° C., 0.76 mL (6.92 mmol) of titanium tetrachloride was added to initiate polymerization. After the initiation of polymerization, the residual isobutylene concentration was measured by gas chromatography, and when the residual amount of isobutylene was less than 0.5%, 4.56 g (19.9 mmol) of 4-phenoxybutyl bromide and 2.85 mL (26.0 mmol) of titanium tetrachloride were added. After stirring at −75° C. for 3 hours, the reaction solution was poured into another separable flask that contains a mixture of 478 g of water and 265 g of a mixed solvent of n-hexane and butyl chloride (mixture ratio of n-hexane:butyl chloride=9:1, v/v) at 50° C. while stirring. Thereafter, the reaction mixture was kept stirred at 50° C. for 1 hour to deactivate the catalyst. After standing still for 30 minutes, the aqueous phase was discharged. Next, the organic phase was washed with 478 g of a 0.5 wt % sodium sulfate solution for 1 hour at 50° C. and then the mixture was stood still for next 30 minutes. Thereafter, the aqueous phase was taken out. The same procedure was repeated again to obtain the purified organic phase.

To this organic phase, 9.52 g (86.5 mmol) of potassium acrylate and 0.88 g (2.73 mmol) of tetrabutylammonium bromide were added and stirring was continued at 50° C. for 24 hours. Thereafter, the organic phase was washed with 478 g of deionized water at 50° C. three times to take out the purified organic phase.

To the organic phase, 0.18 g of 4-methoxyphenol was added, and the solvent was evaporated under reduced pressure to obtain an acryloyl-terminated polyisobutylene polymer P-3. The molecular weight (standard polystyrene) of P-3 was found to be number average molecular weight Mn of 12,877, molecular weight distribution Mw/Mn of 1.21, introduction number of acryloyl group of 1.5, and APHA of 10.

Comparative Example 1

Production of Acryloyl-Terminated Polyisobutylene Polymer (Component Q-1)

After replacing the inside of a 500 mL separable flask with nitrogen, 14 g of n-hexane (dried with molecular sieves) and 163 g of butyl chloride (dried with molecular sieves) were added, and a mixture was cooled to −70° C. while stirring under a nitrogen atmosphere. Next, 109 mL (1.16 mol) of isobutylene, 1.56 g (6.75 mmol) of p-dicumyl chloride and 0.157 g (1.55 mmol) of triethylamine were added. After the reaction mixture was cooled to −70° C., 0.39 mL (3.58 mmol) of titanium tetrachloride was added to initiate polymerization. After the initiation of polymerization, the residual isobutylene concentration was measured by gas chromatography, and when the residual amount of isobutylene was less than 0.5%, 5.19 g (27.0 mmol) of phenoxyethyl acrylate and 9.62 mL (87.7 mmol) of titanium tetrachloride were added.

After stirring at −75° C. for 3 hours, the reaction solution was poured into another separable flask that contains a mixture of 530 g of a 0.2 wt % sodium sulfate aqueous solution 194 g of a mixed solution of n-hexane and butyl chloride (mixing ratio of n-hexane:butyl chloride=1:9, v/v) at 50° C. while stirring.

Thereafter, the reaction mixture was kept stirred at 50° C. for 1 hour to deactivate the catalyst. After standing still for 30 minutes, the aqueous phase was discharged. Next, the

Comparative Example 3

Production of Acryloyl-Terminated Polyisobutylene Polymer (Component Q-3)

Comparative Example 3 was carried out in the same manner as in Comparative Example 1 except that 4.49 mL (40.9 mmol) of titanium tetrachloride was used in the functionalization reaction to prepare an acryloyl-terminated polyisobutylene polymer Q-3. The introduction number of the acryloyl group of Q-3 was 0.3, and this value was not practical and was a very low.

TABLE 1

|  | Example 1 | Example 2 | Example 3 | Example 4 | Comparative Example 1 | Comparative Example 2 | Comparative Example 3 |
|---|---|---|---|---|---|---|---|
| Molar amount of Lewis acid polymerization catalyst used (mmol) (A) | 6.06 | 6.92 | 6.92 | 15.5 | 3.58 | 3.58 | 3.58 |
| functionalization reaction | 34.6 | 26.0 | 26.0 | 38.8 | 87.7 | 15.5 | 40.9 |
| Molar amount of compound (C) having halogen group and phenoxy group (mmol) (B) [1] | 18.2 | 19.9 | 19.9 | 23.2 | 27.0 | 15.5 | 27.0 |
| Ratio of total molar amount of Lewis acid catalyst to molar amount of compound (C) (A)/(B) | 2.23 | 1.65 | 1.65 | 2.34 | 3.38 | 1.23 | 1.65 |
| Amount (g) of Lewis acid catalyst used in production of 1 g of polymer | 0.0877 | 0.0707 | 0.0705 | 0.103 | 0.253 | 0.071 | 0.123 |
| Introduction number of acryloyl group | 1.6 | 1.6 | 1.5 | 1.8 | 1.4 | 0.1 | 0.3 |

[1] Comparative Examples 1 to 3 indicates an amount of phenoxyethylacrylate organic phase was washed with a mixture of 530 g of deionized water and 34.7 g of a 48 wt % sodium hydroxide solution at 50° C. for 1 hour. Then, the mixture was allowed to stand for 30 minutes, and the aqueous phase was discharged. Next, the organic phase was washed with 478 g of a 0.2 wt % sodium sulfate solution for 1 hour at 50° C. and then the mixture was stood still for next 30 minutes. Thereafter, the aqueous phase was taken out. The same procedure was repeated again to obtain the purified organic phase.

Since the organic phase taken out was cloudy, purification with pressure filtration (filter cloth: PE-1-P01 H-202 manufactured by EATON Co., Ltd, filtering aid: Radiolite R100S manufactured by Showa Chemical Industry Co., Ltd., filter aid amount: 8 g per 200 g of organic phase, nitrogen pressure: 0.04 MPa) was repeated three times.

To 400 g of the organic phase subjected to filtration, 0.100 g of 4-methoxyphenol was added and the solvent was evaporated under reduced pressure to obtain an acryloyl-terminated polyisobutylene polymer Q-1. The molecular weight (standard polystyrene) of Q-1 was found to be number average molecular weight Mn of 13,433, molecular weight distribution Mw/Mn of 1.36, introduction number of acryloyl groups of 1.40, and APHA of 100.

Comparative Example 2

Production of Acryloyl-Terminated Polyisobutylene Polymer (Component Q-2)

Comparative Example 2 was carried out in the same manner as in Comparative Example 1 except that 2.98 g (15.5 mmol) of phenoxyethyl acrylate and 2.42 mL (22.1 mmol) of titanium tetrachloride were used in the functionalization reaction, to prepare an acryloyl-terminated polyisobutylene polymer Q-2. The introduction number of acryloyl group of Q-2 was 0.1, and this value was not practical and was very low.

Example 4

Production of Acryloyl-Terminated Polyisobutylene Polymer (Component P-4)

After replacing the inside of a 500 mL separable flask with nitrogen, 49 g of ethylcyclohexane (dried with molecular sieves) and 155 g of toluene (dried with molecular sieves) were added, and a mixture was cooled to 70° C. while stirring under a nitrogen atmosphere. Then 125 mL (1.33 mmol) of isobutylene, 1.79 g (7.74 mmol) of p-dicumyl chloride and 0.248 mL (1.78 mmol) of triethylamine were added. After the reaction mixture was cooled to −70° C., 1.70 mL (15.5 mmol) of titanium tetrachloride was added to initiate polymerization. After the initiation of polymerization, the residual isobutylene concentration was measured by gas chromatography, and when the residual amount of isobutylene was less than 0.5%, 3.68 mL (23.2 mmol) of 3-phenoxypropyl bromide and 4.25 mL (38.8 mmol) of titanium tetrachloride were added. After stirring at −75° C. for 3 hours, the reaction solution was poured into another separable flask that contains a mixture of 242 g of water and 350 g of a mixed solvent of ethylcyclohexane and toluene (toluene:ethylcyclohexane=7.4:2.6, v/v mixing ratio) at 50° C. while stirring. Thereafter, the reaction mixture was kept stirred at 50° C. for 1 hour to deactivate the catalyst. After standing still for 30 minutes, the aqueous phase was discharged. Next, the organic phase was washed with 242 g of deionized water for 1 hour at 50° C. and then the mixture was stood still for next 30 minutes. Thereafter, the aqueous phase was taken out. The same procedure was repeated another three times to obtain the purified organic phase.

To this organic phase, 8.52 g (77.4 mmol) of potassium acrylate and 1.00 g (3.10 mmol) of tetrabutylammonium bromide were added and stirring was continued at 50° C. for 24 hours. Thereafter, the organic phase was washed with 500 g of deionized water at 50° C. three times to obtain the purified organic phase.

The extracted organic phase was subjected to pressure filtration (filter cloth: PE-1-P01H-202 manufactured by EATON Co., Ltd. filtration aid: Radiolite R100S manufactured by Showa Chemical Industry Co., Ltd., filter aid amount: 4 g per 200 g of organic phase, nitrogen pressure: 0.04 MPa), and the organic phase was purified.

To 200 g of the organic phase subjected to filtration, 0.050 g of 4-methoxyphenol was added and the solvent was evaporated under reduced pressure to obtain an acryloyl-terminated polyisobutylene polymer P-4. The molecular weight (standard polystyrene) of P-4 was found to be number average molecular weight Mn of 11,965, molecular weight distribution Mw/Mn of 1.41, introduction number of acryloyl groups of 1.80, and APHA of 30.

The experiments described in the patent documents 1 and 2 were carried out in Comparative Example 1. In this case, the "amount of Lewis acid catalyst required to produce 1 g of polymer" as defined by (the weight of the titanium tetrachloride catalyst used in the manufacture)/(theoretical yield of the resin) was 0.253 g.

In contrast, in the methods described in Examples 1 to 3, the "amount of Lewis acid catalyst required to produce 1 g of polymer" was 0.0877 g in Example 1, the "amount of Lewis acid catalyst required to produce 1 g of polymer" was 0.0707 g in Example 2, and the "amount of Lewis acid catalyst required to produce 1 g of polymer" was 0.0705 g in Example 3.

In Examples 1 to 3, the amount of the Lewis acid catalyst used in the production of the (meth) acryloyl-terminated polyisobutylene polymer was 35% in Example 1, and 28% in Examples 2 and 3, compared with that in Comparative Example 1, indicating that the amount of Lewis acid catalyst required is very small.

In addition, these titanium catalysts undergo hydrolysis in the catalyst deactivation step and become titanium residues including titanium dioxide, titanium hydroxide and the like. However, these are removed from the polymer as aqueous phase is dispensed. These titanium species are insoluble in water and generally are separated from wastewater and discarded as solids. When a large amount of titanium catalyst is used at the time of production, the amount of waste from titanium residues also increases. Therefore, there are concerns that productivity decreases in the case where the treatment takes time and the environmental burden also increases. However, these concerns can be greatly reduced according to embodiments of the present invention.

In Comparative Example 1, a filtration step is necessary for removing the catalyst residue, whereas in embodiments of the present invention, as shown in Examples 1 to 3, a polymer excellent in transparency can be obtained by merely washing the polymer solution with water. Thus, according to embodiments of the present invention, it is possible to simplify the post-treatment process.

Furthermore, in Comparative Example 1, it was difficult to remove the titanium catalyst used in a large amount, so that the obtained resin had a high APHA value of 100, whereas the polymers in Examples 1 to 3 have a relatively low APHA value of 10 to 20. Therefore, according to embodiments of the present invention, a polymer excellent in transparency can be obtained.

On the other hand, as shown in Comparative Examples 2 to 3, when the amount of the titanium catalyst to be used is reduced in the conventionally known production method, the number of the acryloyl group introduced at a terminal of the polymer is drastically reduced. In these cases, the curing rate and mechanical properties of the curable composition may not be practical.

As shown in Example 4, when a mixed solvent of an aromatic hydrocarbon and a linear saturated hydrocarbon or a cyclic saturated hydrocarbon is used as a reaction solvent, an acryloyl-terminated polyisobutylene polymer having a high introduction number of an acryloyl group can be obtained while maintaining excellent transparency (APHA).

In the mixed solvent of the halogenated hydrocarbon and the linear saturated hydrocarbon used in Examples 1 to 3, an acryloyl-terminated polyisobutylene polymer having introduction number of a functional group of 1.5 to 1.6 is obtained. Although the number of introduced functional groups is sufficiently high to such an extent that there is no problem in practical use, and in order to obtain higher cured physical properties (for example, modulus) and higher curing rate, it may be desired that acryloyl-terminated polyisobutylene polymers have more high introduction number of a functional group. In order to meet the requirement, it is useful to use a mixed solvent of the aromatic hydrocarbon and the linear saturated hydrocarbon or the cyclic saturated hydrocarbon as a reaction solvent as shown in Example 4.

Production Example 1

Production of Halogenated Phenoxyalkyl-Terminated Polyisobutylene Polymer (Component R-1)

After replacing the inside of a 500 mL separable flask with nitrogen, 12 g of n-hexane (dried with molecular sieves) and 150 g of butyl chloride (dried with molecular sieves) were added, and a mixture was cooled to −70° C. while stirring under a nitrogen atmosphere. Subsequently, 100 mL (1.06 mol) of isobutylene, 1.43 g (6.19 mmol) of p-dicumyl chloride and 0.144 g (1.42 mmol) of triethylamine were added. After the reaction mixture was cooled to −70° C., 0.47 mL (4.33 mmol) of titanium tetrachloride was added to initiate polymerization. After the initiation of polymerization, the residual isobutylene concentration was measured by gas chromatography, and 3.11 g (15.5 mmol) of 2-phenoxyethyl bromide (β-bromophenetole) and 1.70 mL (15.5 mmol) of titanium tetrachloride were added when the residual amount of isobutylene was less than 0.5%. After stirring at −75° C. for 3 hours, the reaction solution was poured into another separable flask that contains a mixture of 500 g of water, and 180 g of a mixed solution of n-hexane and butyl chloride (mixing ratio of butyl chloride:n-hexane=9:1, v/v) at 50° C. while stirring. Thereafter, the reaction mixture was kept stirred at 50° C. for 1 hour to deactivate the catalyst. After standing still for 30 minutes, the aqueous phase was discharged. Next, the organic phase was washed with 478 g of a 0.5 wt % sodium sulfate solution for 1 hour at 50° C. and then the mixture was stood still for next 30 minutes. Thereafter, the aqueous phase was taken out. The same procedure was repeated again to obtain the organic phase containing the reaction mixture.

In order to analyze the polymer obtained in Production Example 1, 20 ml of the reaction mixture was weighed, and the solvent was evaporated under reduced pressure to obtain a halogenated phenoxyalkyl-terminated polyisobutylene polymer R-1. The molecular weight (standard polystyrene) of R-1 was found to have number average molecular weight Mn of 12,724, molecular weight distribution Mw/Mn of 1.49, and introduction number of a halogenated phenoxyalkyl group of 1.7.

Next, an experiment was conducted to evaluate the catalytic ability of various phase transfer catalysts using the polymer solution obtained in Production Example 1. Here, the reaction temperature was 60° C. and the reaction time was 24 hours, respectively, and the catalytic ability of each phase transfer catalyst was examined by comparing introduction numbers of acryloyl group of the polymer obtained under the conditions.

Example 5

Next, to 6 g of the solution of the polymer R-1 obtained in Production Example 1 (measured value: polymer concentration of 17.7 wt %), 0.0919 g ($8.35 \times 10^{-4}$ mol) of potassium acrylate, and 0.0163 g ($5.86 \times 10^{-5}$ mol, 1.53 parts by weight based on 100 parts by weight of the polymer) of tetrabutylammonium chloride were added and reacted at 60° C. for 24 hours. After the reaction, about 5 ml of the reaction solution was reprecipitated by adding it to a mixed solvent of acetone and methanol (mixing ratio of acetone/methanol=20 ml/20 ml) to isolate an acryloyl-terminated polyisobutylene polymer P-5. The introduction number of the acryloyl group was 1.5.

Example 6

Acryloylation was carried out in the same manner as in Example 5 except that 0.0189 g ($5.86 \times 10^{-5}$ mol, 1.78 parts by weight relative to 100 parts by weight of the polymer) of tetrabutylammonium bromide was used as a phase transfer catalyst to obtain an acryloyl-terminated polyisobutylene polymer P-6. The introduction number of acryloyl groups was 1.6.

Example 7

Acryloylation was carried out in the same manner as in Example 5 except that 0.0216 g ($5.86 \times 10^{-5}$ mol, 2.04 parts by weight relative to 100 parts by weight of the polymer) of tetrabutylammonium iodide was used as a phase transfer catalyst to obtain an acryloyl-terminated polyisobutylene polymer P-7. The introduction number of the acryloyl group was 1.4.

Example 8

Acryloylation was carried out in the same manner as in Example 5 except that 0.0320 g ($5.86 \times 10^{-5}$ mol, 3.02 parts by weight relative to 100 parts by weight of the polymer) of tetraoctylammonium bromide was used as a phase transfer catalyst to obtain an acryloyl-terminated polyisobutylene polymer P-8. The introduction number of acryloyl groups was 1.6.

Example 9

Acryloylation was carried out in the same manner as in Example 5 except that 0.0265 g ($5.86 \times 10^{-5}$ mol, 2.49 parts by weight relative to 100 parts by weight of the polymer) of tributyldodecylphosphonium bromide was used as a phase transfer catalyst to obtain an acryloyl-terminated polyisobutylene polymer P-9. The introduction number of acryloyl groups was 1.6.

Example 10

Acryloylation was carried out in the same manner as in Example 5 except that 0.0199 g ($5.86 \times 10^{-5}$ mol, 1.87 parts by weight relative to 100 parts by weight of the polymer) of tetrabutylphosphonium bromide was used as the phase transfer catalyst to obtain an acryloyl-terminated polyisobutylene polymer P-10. The introduction number of acryloyl groups was 1.6.

Next, in order to further investigate the catalytic ability of the phase transfer catalyst, the acryloylation reaction rates were compared by reacting at 60° C. for 4 hours using various phase transfer catalysts, and stopping a reaction after 4 hours. After completion of the reaction for 4 hours, the phase transfer catalyst giving a high introduction number of acryloyl group is highly active and can be suitably used in embodiments of the present invention.

Production Example 2

Production of Halogenated Phenoxyalkyl-Terminated Polyisobutylene Polymer (Component R-2)

After replacing the inside of a 500 mL separable flask with nitrogen, 17 g of n-hexane (dried with molecular sieves) and 209 g of butyl chloride (dried with molecular sieves) were added, and a mixture was cooled to −70° C. while stirring under a nitrogen atmosphere. Subsequently, 140 mL (1.48 mol) of isobutylene, 2.00 g (8.65 mmol) of p-dicumyl chloride and 0.201 g (1.99 mmol) of triethylamine were added. After the reaction mixture was cooled to −70° C., 0.66 mL (6.06 mmol) of titanium tetrachloride was added to initiate polymerization. After the initiation of polymerization, the residual isobutylene concentration was measured by gas chromatography, and when the residual amount of isobutylene was less than 0.5%, 4.35 g (21.6 mmol) of 2-phenoxyethyl bromide (β-bromophenetole) and 1.90 nit (17.3 mmol) of titanium tetrachloride were added. After stirring at −75° C. for 3 hours, the reaction solution was poured into another separable flask that contains a mixture of 478 g of water and 265 g of a mixed solution of n-hexane and butyl chloride (mixing ratio of butyl chloride: n-hexane=9:1, v/v) at 50° C. while stirring. Thereafter, the reaction mixture was kept stirred at 50° C. for 1 hour to deactivate the catalyst. After standing still for 30 minutes, the aqueous phase was discharged. Next, the organic phase was washed with 478 g of a 0.5 wt % sodium sulfate solution for 1 hour at 50° C. and then the mixture was stood still for next 30 minutes. Thereafter, the aqueous phase was taken out. The same procedure was repeated again to obtain the organic phase containing the reaction mixture.

In order to analyze the polymer obtained in Production Example 2, 20 ml of the reaction mixture was weighed and the solvent was evaporated under reduced pressure to obtain a halogenated phenoxyalkyl-terminated polyisobutylene polymer R-2. The molecular weight of R-2 (standard polystyrene) had number average molecular weight Mn of 11,360, molecular weight distribution Mw/Mn of 1.28, and introduction number of halogenated phenoxyalkyl terminal was 1.6.

Example 11

Next, to 10 g of the solution of the polymer R-2 obtained in Production Example 2 (measured value: polymer concentration of 15.0 wt %), 0.145 g ($1.32 \times 10^{-3}$ mol) of potassium acrylate, and 0.0150 g ($4.65 \times 10^{-5}$ mol, 1.00 part by weight based on 100 parts by weight of the polymer) of tetrabutylammonium chloride were added, and the mixture was reacted at 60° C. for 4 hours. After the reaction, about 5 ml of the reaction solution was reprecipitated by adding it to a mixed solvent of acetone and methanol (mixing ratio of acetone/methanol=20 ml/20 ml) to isolate an acryloyl-terminated polyisobutylene polymer P-11. The introduction number of acryloyl groups was 0.66.

Example 12

Acryloylation was carried out in the same manner as in Example 11 except that 0.0188 g ($4.65 \times 10^{-5}$ mol, 1.25 parts by weight relative to 100 parts by weight of the polymer) of methyltrioctylammonium bromide was used as the phase transfer catalyst to obtain an acryloyl-terminated isobutylene polymer P-12. The introduction number of the acryloyl group was 0.54.

Example 13

Acryloylation was carried out in the same manner as in Example 11 except that 0.0294 g ($4.65 \times 10^{-5}$ mol, 1.96 parts by weight relative to 100 parts by weight of the polymer) of dimethyldioctadecylammonium bromide was used as the phase transfer catalyst to obtain an acryloyl-terminated polyisobutylene polymer P-13. The introduction number of acryloyl groups was 0.41.

Example 14

Acryloylation was carried out in the same manner as in Example 11 except that 0.0162 g ($4.65 \times 10^{-5}$ mol, 1.08 parts by weight based on 100 parts by weight of the polymer) of trimethyloctadecylammonium chloride was used as the phase transfer catalyst to obtain an acryloyl-terminated polyisobutylene polymer P-14. The introduction number of acryloyl groups was 0.41.

Example 15

Acryloylation was carried out in the same manner as in Example 11 except that 0.0130 g ($4.65 \times 10^{-5}$ mol, 0.87 parts by weight relative to 100 parts by weight of the polymer) of decyltrimethylammonium bromide was used as a phase transfer catalyst to obtain an acryloyl-terminated polyisobutylene polymer P-15. The introduction number of acryloyl groups was 0.10.

As results of the above Examples 11 to 12, the catalyst having one methyl group or no methyl group as the substituent on the nitrogen atom of the ammonium salt has high catalytic activity in the acryloylation reaction. On the other hand, as shown in Examples 13 to 15, those containing two or more methyl groups as substituents on the nitrogen atom of the ammonium salt have catalytic activity. However, these are relatively lower activity than other ammonium salts.

Although this reason is not necessarily clarified, when the phase transfer catalyst has more hydrophobicity and lower hydrophilicity, the dissolution into the organic phase and the approach to the halogenated phenoxyalkyl terminated polyisobutylene polymer become advantageous.

Therefore, those having a substituent that makes the phase transfer catalyst more hydrophobic are effective in embodiments of the present invention, and for example, those having a large number of carbon atoms can be suitably used as a substituent on the ammonium salt.

Next, in order to investigate the effect of adding the aprotic amphiphilic solvent, various aprotic amphiphilic solvents were added and the reaction was carried out. Here, the reaction was terminated at 60° C. for 4 hours, and the evaluation was carried out by comparing the number of acryloyl groups introduced into the polymer at that time.

Production Example 3

Production of Halogenated Phenoxyalkyl-Terminated Polyisobutylene Polymer (Component R-3)

After replacing the inside of a 500 mL separable flask with nitrogen, 17 g of n-hexane (dried with molecular sieves) and 209 g of butyl chloride (dried with molecular sieves) were added, and a mixture was cooled to −70° C. while stirring under a nitrogen atmosphere. Subsequently, 140 mL (1.48 mol) of isobutylene, 2.00 g (8.65 mmol) of p-dicumyl chloride and 0.201 g (1.99 mmol) of triethylamine were added. After the reaction mixture was cooled to −70° C., 0.76 mL (6.92 mmol) of titanium tetrachloride was added to initiate polymerization.

After the initiation of polymerization, the residual isobutylene concentration was measured by gas chromatography, and when the residual amount of isobutylene was less than 0.5%, 3.15 ml (19.9 mmol) of 3-phenoxypropyl bromide and 2.85 ml (26.0 mmol) of titanium tetrachloride were added. After stirring at −75° C. for 3 hours, the reaction solution was poured into another separable flask that contains a mixture of 478 g of water and 265 g of a mixed solution of n-hexane and butyl chloride (mixing ratio of butyl chloride: n-hexane=9:1, v/v) at 50° C. while stirring. Thereafter, the reaction mixture was kept stirred at 50° C. for 1 hour to deactivate the catalyst. After standing still for 30 minutes, the aqueous phase was discharged. Next, the organic phase was washed with 478 g of a 0.5 wt % sodium sulfate solution for 1 hour at 50° C. and then the mixture was stood still for next 30 minutes. Thereafter, the aqueous phase was taken out. The same procedure was repeated again to obtain the organic phase containing the reaction mixture.

In order to analyze the polymer obtained in Production Example 3, 20 ml of the reaction mixture was weighed, and the solvent was evaporated under reduced pressure to obtain a halogenated phenoxyalkyl-terminated polyisobutylene polymer R-3. The molecular weight (standard polystyrene) of R-3 had number average molecular weight Mn of 13,036, molecular weight distribution Mw/Mn of 1.20, and introduction number of halogenated phenoxyalkyl groups of 1.8.

Example 16

Next, to 10 g of the solution of the polymer R-3 obtained in Production Example 3 (measured value: polymer concentration of 15.0 wt %), 0.127 g ($1.15 \times 10^{-3}$ mol) of potassium acrylate, and 0.0150 g ($4.65 \times 10^{-5}$ mol, 1.00 parts by weight based on 100 parts by weight of the polymer) of tetrabutylammonium bromide were added, and the mixture was reacted at 60° C. for 4 hours. After the reaction, about 5 ml of the reaction solution was reprecipitated by adding it to a mixed solvent of acetone and methanol (mixing ratio of acetone/methanol=20 ml/20 ml) to isolate an acryloyl-terminated polyisobutylene polymer P-16. The introduction number of acryloyl groups was 0.79.

Example 17

Further, to 10 g of a solution of the polymer R-3 obtained in Production Example 3 (measured value: polymer concentration of 15.0 wt %), 0.127 g ($1.15 \times 10^{-3}$ mol) of potassium acrylate, and 0.0150 g ($4.65 \times 10^{-5}$ mol, 1.00 parts by weight based on 100 parts by weight of the polymer) of tetrabutylammonium chloride, 0.5 g (33.3 parts by weight based on 100 parts by weight of the polymer) of N,N-dimethylacetamide were added, and the mixture was reacted at 60° C. for 4 hours. After the reaction, about 5 ml of the reaction solution was reprecipitated by adding it to a mixed solvent of acetone and methanol (mixing ratio of acetone/methanol=20 ml/20 ml) to isolate an acryloyl-terminated polyisobutylene polymer P-17. The introduction number of the acryloyl group was 1.51.

Example 18

Acryloylation was carried out in the same manner as in Example 17 except that 0.5 g of N,N-dimethylformamide (33.3 parts by weight based on 100 parts by weight of the polymer) was used as the aprotic amphiphilic solvent to obtain an acryloyl-terminated polyisobutylene polymer P-18. The introduction number of the acryloyl group was 1.26.

Example 19

Acryloylation was carried out in the same manner as in Example 17 except that 0.5 g of dimethylsulfoxide (33.3 parts by weight based on 100 parts by weight of the polymer) was used as the aprotic amphiphilic solvent to obtain an acryloyl-terminated polyisobutylene polymer P-19. The introduction number of the acryloyl group was 1.46.

Example 20

Acryloylation was carried out in the same manner as in Example 17 except that 0.5 g of acetone (33.3 parts by weight based on 100 parts by weight of the polymer) was used as the aprotic amphiphilic solvent to obtain an acryloyl-terminated polyisobutylene polymer P-20. The introduction number of the acryloyl group was 0.81.

Example 21

Acryloylation was carried out in the same manner as in Example 17 except that 0.5 g of tetrahydrofuran (33.3 parts by weight based on 100 parts by weight of the polymer) was used as the aprotic amphiphilic solvent to obtain an acryloyl-terminated polyisobutylene polymer P-21. The introduction number of acryloyl groups was 1.40.

Example 22

Acryloylation was carried out in the same manner as in Example 17 except that 0.5 g of acetonitrile (33.3 parts by weight based on 100 parts by weight of the polymer) was used as the aprotic amphiphilic solvent to obtain an acryloyl-terminated polyisobutylene polymer P-22. The introduction number of acryloyl groups was 1.49.

Example 23

Acryloylation was carried out in the same manner as in Example 17 except that 0.3 g of dimethylacetamide (20 parts by weight based on 100 parts by weight of the polymer) was used as the aprotic amphiphilic solvent to obtain an acryloyl-terminated polyisobutylene polymer P-23. The introduction number of the acryloyl group was 1.52.

Example 24

Acryloylation was carried out in the same manner as in Example 17 except that 0.1 g of dimethylacetamide (6.7 parts by weight based on 100 parts by weight of the polymer) was used as the aprotic amphiphilic solvent to obtain an acryloyl-terminated polyisobutylene polymer P-24. The introduction number of the acryloyl group was 1.52.

Example 25

Acryloylation was carried out in the same manner as in Example 17 except that 0.025 g of dimethylacetamide (1.67 parts by weight based on 100 parts by weight of the polymer) was used as the aprotic amphiphilic solvent to obtain an acryloyl-terminated polyisobutylene polymer P-25. The introduction number of the acryloyl group was 1.51.

Reference Example 1

Acryloylation was carried out in the same manner as in Example 17 except that 0.5 g of methanol (33.3 parts by weight based on 100 parts by weight of the polymer) was used as the protic amphiphilic solvent instead of the aprotic amphiphilic solvent to obtain an acryloyl-terminated polyisobutylene polymer S-1. The introduction number of acryloyl groups was 0.01, and the acryloylation reaction was very slow.

Reference Example 2

Acryloylation was carried out in the same manner as in Example 17 except that 0.5 g of ethanol (33.3 parts by weight based on 100 parts by weight of the polymer) was used as the protic amphiphilic solvent instead of the aprotic amphiphilic solvent to obtain an acryloyl-terminated polyisobutylene polymer S-2. The introduction number of the acryloyl group was 0.02, and the progress of the acryloylation reaction was very slow.

Reference Example 3

Acryloylation was carried out in the same manner as in Example 17 except that 0.027 g of acrylic acid (1.8 parts by weight based on 100 parts by weight of the polymer) was used as the protic amphiphilic solvent instead of the aprotic amphiphilic solvent to obtain an acryloyl-terminated polyisobutylene polymer S-3. The introduction number of the acryloyl group was 0.01, and the progress of the acryloylation reaction was very slow.

Example 26

Production of Acryloyl-Terminated Polyisobutylene Polymer (Component P-26)

After replacing the inside of a 500 mL separable flask with nitrogen, 17 g of n-hexane (dried with molecular sieves) and 209 g of butyl chloride (dried with molecular sieves) were added, and a mixture was cooled to −70° C. while stirring under a nitrogen atmosphere. Subsequently, 140 mL (1.48 mol) of isobutylene, 2.00 g (8.65 mmol) of p-dicumyl chloride and 0.201 g (1.99 mmol) of triethylamine were added. After the reaction mixture was cooled to −70° C., 0.76 mL (6.92 mmol) of titanium tetrachloride was added to initiate polymerization. After the initiation of polymerization, the residual isobutylene concentration was measured by gas chromatography, and when the residual amount of isobutylene was less than 0.5%, 3.15 g (19.9 mmol) of 3-phenoxypropyl bromide and 2.85 mL (26.0 mmol) of titanium tetrachloride were added. After stirring at −75° C. for 3 hours, the reaction solution was poured into another separable flask that contains a mixture of 478 g of water and 265 g of a mixed solvent of n-hexane and butyl chloride (mixing ratio: n-hexane:butyl chloride=1:9, v/v) at 50° C. while stirring. Thereafter, the reaction mixture was kept stirred at 50° C. for 1 hour to deactivate the catalyst. After standing still for 30 minutes, the aqueous phase was discharged. Next, the organic phase was washed with 478 g of a 0.5 wt % sodium sulfate solution for 1 hour at 50° C. and then the mixture was stood still for next 30 minutes. Thereafter, the aqueous phase was taken out. The same procedure was repeated again to obtain the organic phase.

To this organic phase, 9.52 g (86.5 mmol) of potassium acrylate, 0.88 g (2.73 mmol) of tetrabutylammonium bromide, and 1.50 g of N,N-dimethylacetamide (1.70 parts by weight based on the theoretical yield of the polymer) were added and stirring was continued at 50° C. for 13 hours. Thereafter, 478 g of deionized water was added to the solution and the mixture was kept stirring at 50° C. for 1 hour. After standing for 30 minutes, the aqueous phase was discharged and the organic phase was washed with 478 g of water twice and separated.

To the organic phase, 0.18 g of 4-methoxyphenol was added, and the solvent was evaporated under reduced pressure to obtain an acryloyl-terminated polyisobutylene polymer P-26. The molecular weight (standard polystyrene) of P-26 was found to be number average molecular weight Mn of 12,938, molecular weight distribution Mw/Mn of 1.19, introduction number of acryloyl group of 1.6, and APHA of 50.

From the results of Examples 16 to 26 and Reference Examples 1 to 3 as described above, by allowing an aprotic amphiphilic solvent to coexist, the acryloylation reaction can be remarkably promoted and the productivity of the (meth) acryloyl-terminated polyisobutylene polymer can be increased. On the other hand, a protic amphiphilic solvent such as methanol, ethanol or acrylic acid inhibits the acryloylation reaction, indicating that the progress of the reaction is very slow.

Next, the influence of water in the system on the acryloylation reaction was investigated.

Example 27

Acryloylation was carried out in the same manner as in Example 17 except that 0.025 g of dimethylacetamide (1.67 parts by weight based on 100 parts by weight of the polymer) was used as the aprotic amphiphilic solvent and the reaction time was 2 hours to obtain an acryloyl-terminated polyisobutylene polymer P-27. The introduction number of the acryloyl group was 1.19. The polymer solution used in this example was obtained in Production Example 3 and its water content was 530 ppm.

Example 28

To 50 g of the polymer solution obtained in Production Example 3 was added about 10 of magnesium sulfate, and stirring was continued at room temperature for 1 hour. Thereafter, the magnesium sulfate was filtered off and the water content of the obtained filtrate was measured to be 153 ppm.

Acryloylation reaction was carried out for 2 hours in the same manner as in Example 26 except that the polymer solution thus obtained was used to obtain an acryloyl-terminated polyisobutylene polymer P-28. The introduction number of acryloyl groups was 1.44.

From the results of Examples 27 and 28 as described above, in the acryloylation reaction, the reaction proceeds more rapidly as the water content decreases in the system. Therefore, when high productivity is desired, it may be preferable that the content of water in the reaction system is small.

Next, investigation was carried out using crown ether as a phase transfer catalyst. From Example 29 below, the crown ether can also be suitably used as the phase transfer catalyst.

Example 29

To a reaction system, 10 g of the solution of the polymer R-3 obtained in Production Example 3 (measured value: polymer concentration of 15.0 wt %), 0.127 g ($1.15 \times 10^{-3}$ mol) of potassium acrylate, and 0.123 g of 18-crown-6-ether ($4.65 \times 10^{-4}$ mol, 8.2 parts by weight based on 100 parts by weight of the polymer) were added and reacted at 60° C. for 4 hours. After the reaction, about 5 ml of the reaction solution was reprecipitated by adding it to a mixed solvent of acetone and methanol (mixing ratio of acetone/methanol=20 ml/20 ml) to isolate an acryloyl-terminated polyisobutylene polymer P-29. The introduction number of the acryloyl group was 1.33.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

The invention claimed is:

1. A method for producing a (meth)acryloyl-terminated polyisobutylene polymer (A) represented by the following general formula (1),

[Chemical formula 1]

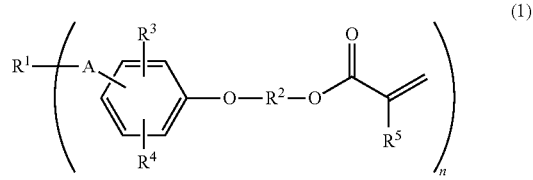

wherein $R^1$ represents a monovalent or multivalent aromatic hydrocarbon group, or a monovalent or multivalent aliphatic hydrocarbon group, A represents a polyisobutylene polymer, $R^2$ represents a divalent saturated hydrocarbon group having 2 to 6 carbons and having no heteroatom, each of $R^3$ and $R^4$ represents a hydrogen, a monovalent hydrocarbon having 1 to 20 carbons, or an alkoxy group, $R^5$ represents a hydrogen or a methyl group, and n represents natural number, the method comprising:

a step 1 of polymerizing an isobutylene monomer under the presence of a Lewis acid catalyst to prepare a polyisobutylene polymer (B) represented by the following general formula (2),

[Chemical formula 2]

(2)

wherein $R^1$, A, and n are the same as in the general formula (1), and Z represents a chlorine, a bromine, an iodine, an acetoxy group, or a methoxy group;

a step 2 of reacting the polyisobutylene polymer (B) with a compound (C) having a halogen group and a phenoxy group as represented by the following general formula (3) under the presence of a Lewis acid catalyst to prepare a halogenated phenoxyalkyl-terminated polyisobutylene polymer (D) represented by the following general formula (4), wherein a ratio of a total molar amount of the Lewis acid catalyst to a molar amount of the compound (C) having a halogen group and a phenoxy group is 3.3 or less,

[Chemical formula 3]

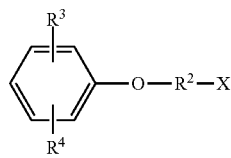
(3)

wherein $R^2$, $R^3$, and $R^4$ are the same as in the general formula (1), and X represents a chlorine, a bromine, or an iodine,

[Chemical formula 4]

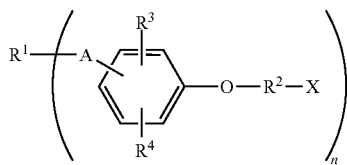
(4)

wherein $R^1$, $R^2$, $R^3$, $R^4$, A, and n are the same as in the general formula (1), and X is the same as in the general formula (3); and a step 3 of reacting the halogenated phenoxyalkyl-terminated polyisobutylene polymer (D) with an acrylic acid compound (E) represented by the following general formula (5) to prepare the (meth)acryloyl-terminated polyisobutylene polymer (A),

[Chemical formula 5]

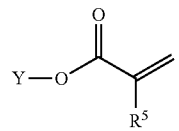
(5)

wherein $R^5$ represents a hydrogen or a methyl group, and Y represents a hydrogen, a lithium, a sodium, a potassium, a rubidium, or a cesium.

2. The method according to claim 1, wherein a reaction solvent is used in the step 3, and wherein the reaction solvent is at least one solvent selected from the group consisting of a halogenated hydrocarbon, a linear saturated hydrocarbon, a cyclic saturated hydrocarbon, and an aromatic hydrocarbon.

3. The method according to claim 1, wherein a reaction solvent is used in the step 3, and wherein the reaction solvent is a halogenated hydrocarbon, or a mixed solvent of a halogenated hydrocarbon and a linear saturated hydrocarbon.

4. The method according to claim 1, wherein a reaction solvent is used in the step 3, and wherein the reaction solvent is an aromatic hydrocarbon, or a mixed solvent of an aromatic hydrocarbon and a linear saturated hydrocarbon or a cyclic saturated hydrocarbon.

5. The method according to claim 1, wherein the step 3 is carried out under the presence of at least one compound selected from the group consisting of an ammonium salt, a phosphonium salt, and a crown ether.

6. The method according to claim 5, wherein the ammonium salt comprises one or less of a methyl group as a substituent on a nitrogen atom.

7. The method according to claim 1, further adding an aprotic amphiphilic solvent in the step 3.

8. The method according to claim 1, wherein a content of water is 1000 ppm or less in the step 3.

9. The method according to claim 1, wherein the (meth)acryloyl-terminated polyisobutylene polymer has a number average molecular weight of 8000 to 500000 as measured by size exclusion chromatography.

10. The method according to claim 1, wherein in the chemical formula 5, Y represents a lithium, a sodium, a potassium, a rubidium, or a cesium.

* * * * *